US008772694B2

(12) United States Patent
Sugano et al.

(10) Patent No.: US 8,772,694 B2
(45) Date of Patent: Jul. 8, 2014

(54) IMAGE SENSOR PROVIDED WITH PLURAL PIXEL CIRCUITS ARRANGED IN PLURAL ROWS AND PLURAL COLUMNS

(75) Inventors: Hiroki Sugano, Kanagawa (JP); Fukashi Morishita, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/277,921

(22) Filed: Oct. 20, 2011

(65) Prior Publication Data
US 2012/0112039 A1    May 10, 2012

(30) Foreign Application Priority Data
Nov. 5, 2010   (JP) .................. 2010-248648

(51) Int. Cl.
*H01L 27/146* (2006.01)
*G01J 1/44* (2006.01)

(52) U.S. Cl.
USPC .................. 250/208.1; 250/214 R

(58) Field of Classification Search
USPC ........... 250/208.1, 214 R; 348/294, 296, 297, 348/302–205; 257/440
See application file for complete search history.

(56) References Cited

U.S. PATENT DOCUMENTS
2010/0231768 A1 *   9/2010   Utsunomiya et al. ......... 348/302

FOREIGN PATENT DOCUMENTS
JP    2007-013245    *   1/2007
JP    2010-183458    *   8/2010

* cited by examiner

*Primary Examiner* — Georgia Y Epps
*Assistant Examiner* — Carolynn A Moore
(74) *Attorney, Agent, or Firm* — McDermott Will & Emery LLP

(57) ABSTRACT

An image sensor with a small circuit area is provided. In the image sensor, a TX decoder which generates transfer signals TX<3:0> includes a latch circuit. The latch circuit is set when a corresponding row group is selected and when a set signal is set to an "H" level, and is reset when a reset signal is set to an "L" level. The latch circuit serves also as a voltage level shift circuit which converts the "H" level of a signal from a first power supply voltage into a second power supply voltage. Therefore, plural row groups can be selected by setting plural latch circuits. It is not necessary to provide a voltage level shift circuit separately.

9 Claims, 29 Drawing Sheets

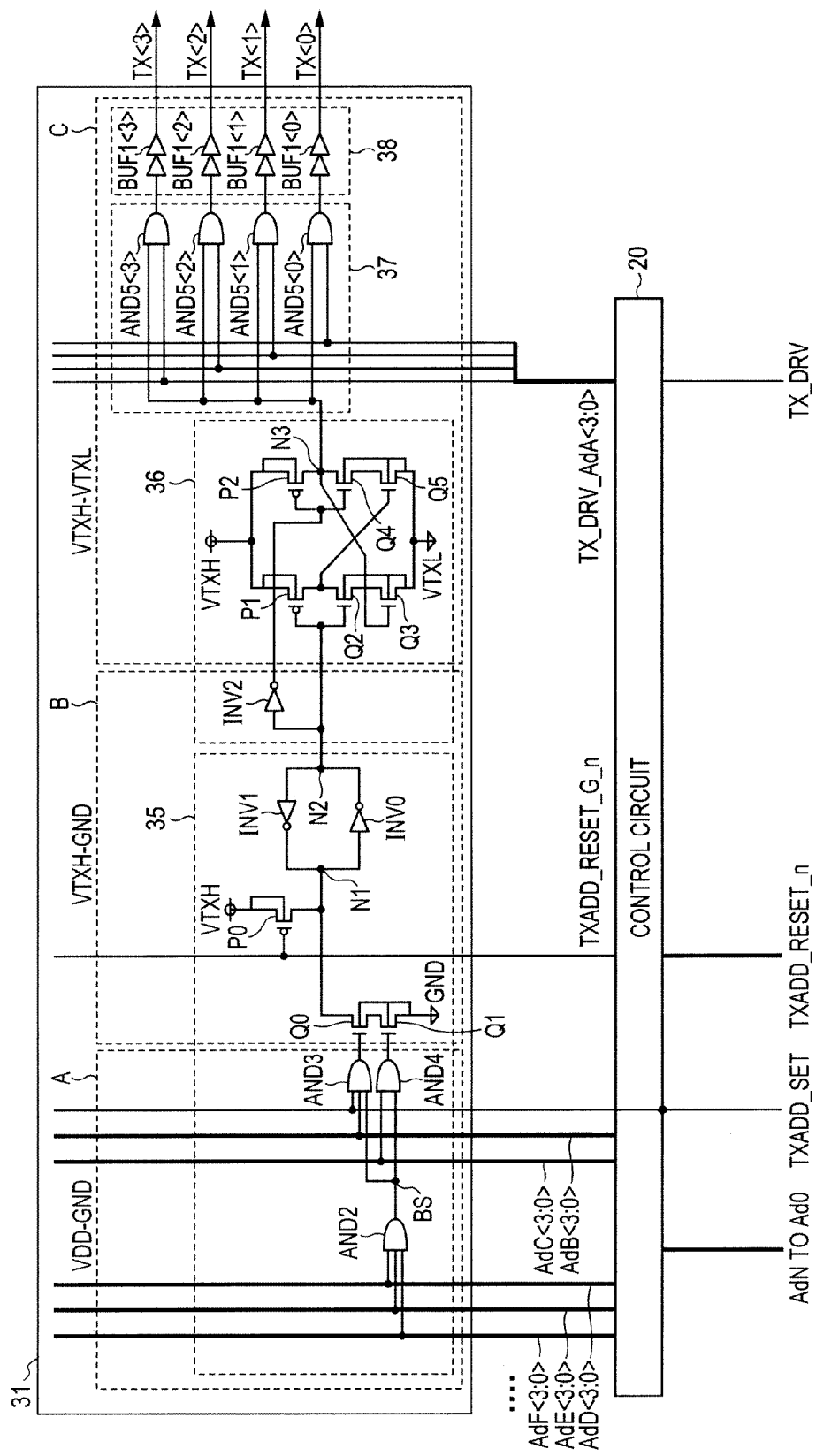

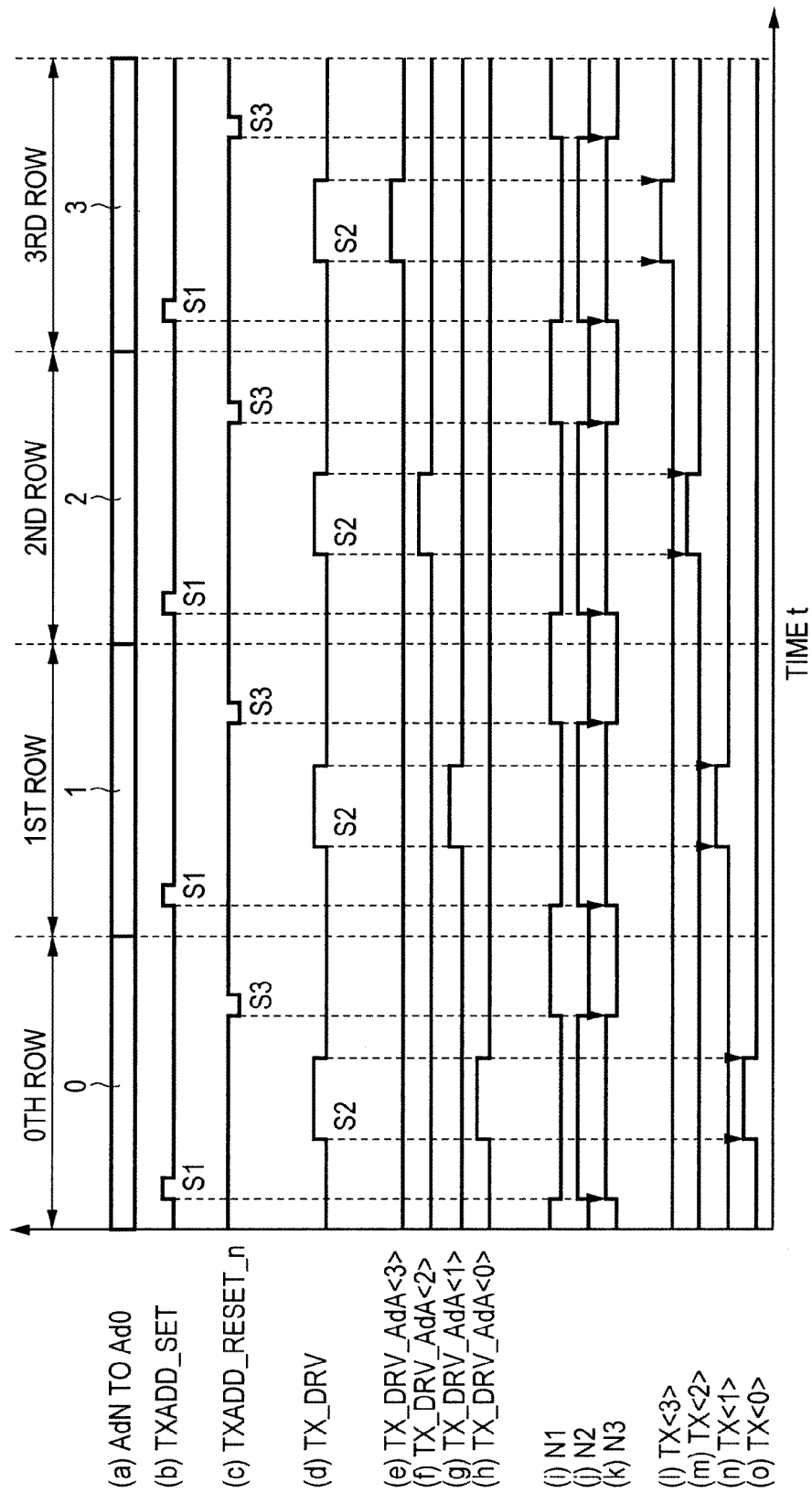

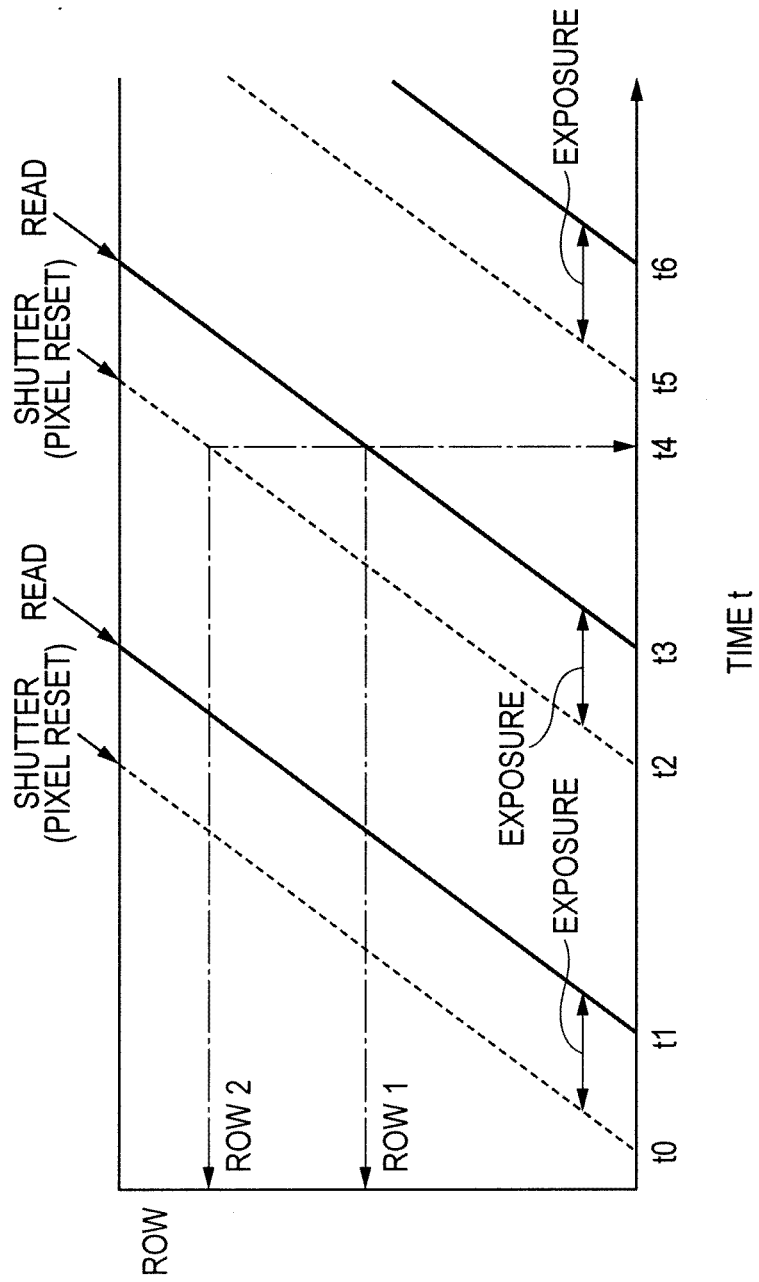

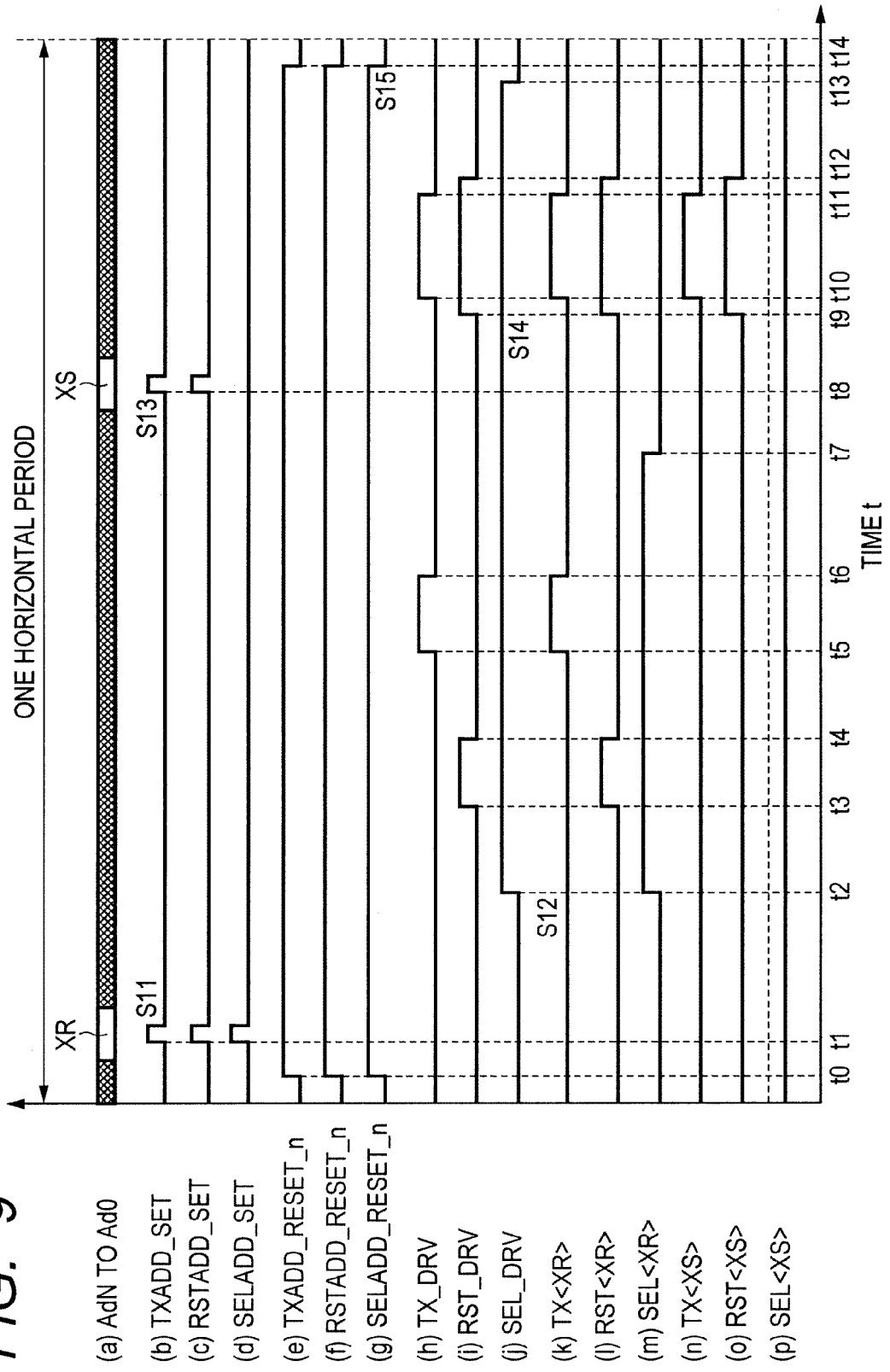

PHOTOGRAPHING STILL IMAGE
WITH HYBRID ELECTRONIC SHUTTER

PHOTOGRAPHING STILL IMAGE
WITH MECHANICAL SHUTTER

PHOTOGRAPHING STILL IMAGE
WITH ROLLING ELECTRONIC SHUTTER

FIG. 13

| Ad | Ad-2 | TX | SELR | RSTR | SELB | RSRB |
|---|---|---|---|---|---|---|
| 513 | 511 | 513 | 127 | 127 | — | — |
| 512 | 510 | 512 | | | 127 | 127 |
| 511 | 509 | 511 | | | | |
| 510 | 508 | 510 | | | | |
| 509 | 507 | 509 | 126 | 126 | | |
| 508 | 506 | 508 | | | | |
| 507 | 505 | 507 | | | 126 | 126 |
| 506 | 504 | 506 | | | | |
| 505 | 503 | 505 | 125 | 125 | | |
| 504 | 502 | 504 | | | | |
| 503 | 501 | 503 | | | 125 | 125 |
| 502 | 500 | 502 | | | | |
| | | | | | | |
| | | | | | | |
| | | | | | | |
| | | | | | | |
| | | | 3 | 3 | | |
| 15 | 13 | 15 | | | | |
| 14 | 12 | 14 | | | 3 | 3 |
| 13 | 11 | 13 | | | | |
| 12 | 10 | 12 | 2 | 2 | | |
| 11 | 9 | 11 | | | | |
| 10 | 8 | 10 | | | 2 | 2 |
| 9 | 7 | 9 | | | | |
| 8 | 6 | 8 | 1 | 1 | | |
| 7 | 5 | 7 | | | | |
| 6 | 4 | 6 | | | 1 | 1 |
| 5 | 3 | 5 | | | | |
| 4 | 2 | 4 | 0 | 0 | | |
| 3 | 1 | 3 | | | | |
| 2 | 0 | 2 | | | 0 | 0 |
| 1 | — | 1 | — | — | | |
| 0 | — | 0 | | | | |

FIG. 26(a)

| Ad3 | Ad2 | AdB<3> | AdB<2> | AdB<1> | AdB<0> |
|---|---|---|---|---|---|
| 0 | 0 | 0 | 0 | 0 | 1 |
| 0 | 1 | 0 | 0 | 1 | 0 |
| 1 | 0 | 0 | 1 | 0 | 0 |
| 1 | 1 | 1 | 0 | 0 | 0 |

FIG. 26(b)

| HIGHER-ORDER DEGENERATE NUMBER | DEGENERATE ADDRESS | UNI_REG<4:0> | XF<3><1> ADDRESS OPERATION | XF<2><0> ADDRESS OPERATION | XE<3><1> ADDRESS OPERATION | XE<2><0> ADDRESS OPERATION |
|---|---|---|---|---|---|---|
| 1 | NONE | 0000 | ADDRESS OPERATION | ADDRESS OPERATION | ADDRESS OPERATION | ADDRESS OPERATION |
| 2 | Ad11 | 0001 | Ad10 | Ad10 NOT | ADDRESS OPERATION | ADDRESS OPERATION |
| 4 | Ad11, Ad10 | 0010 | 11 | 11 | ADDRESS OPERATION | ADDRESS OPERATION |
| ..... | | | | | | |

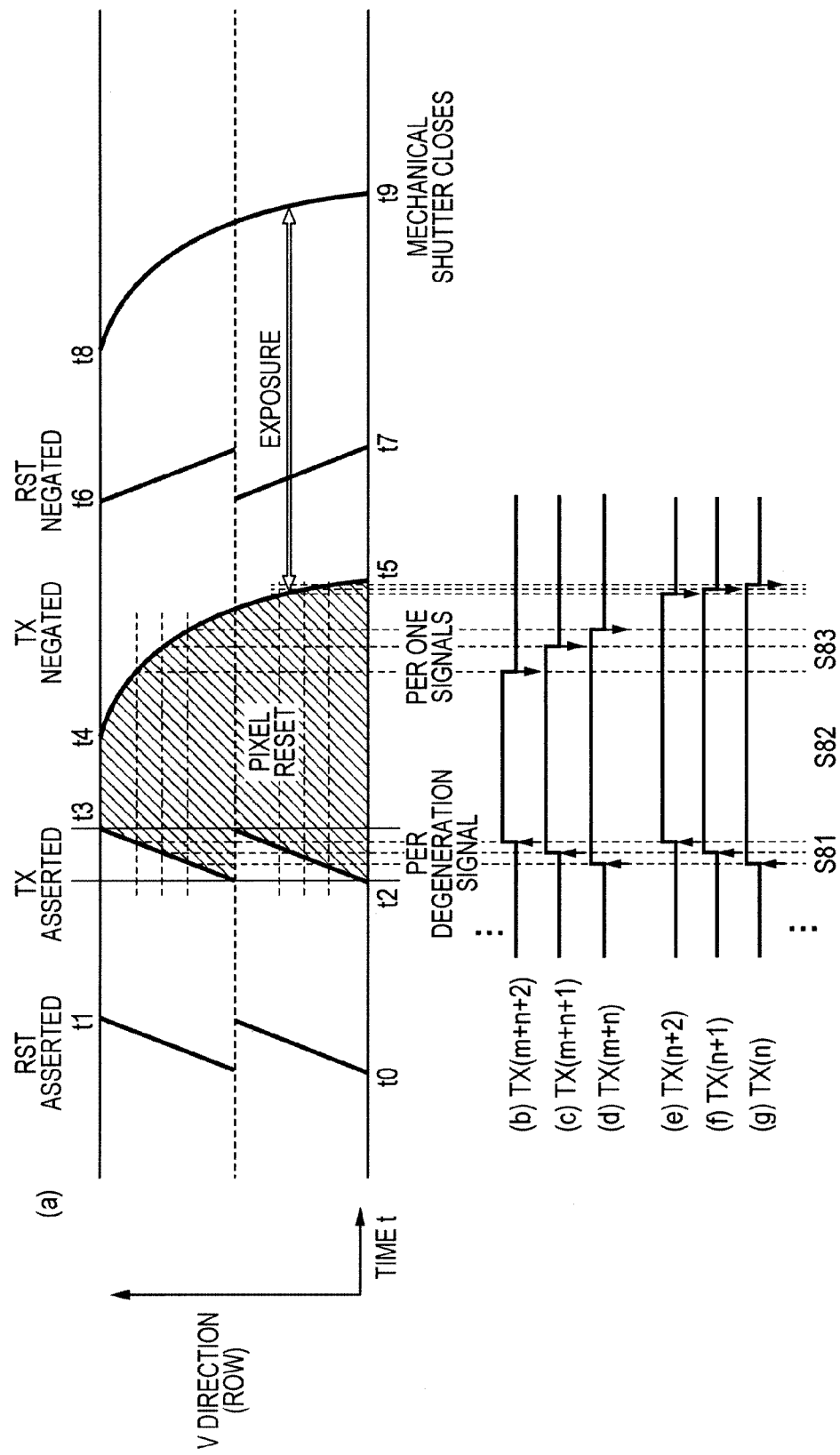

IMAGE SENSOR PROVIDED WITH PLURAL PIXEL CIRCUITS ARRANGED IN PLURAL ROWS AND PLURAL COLUMNS

CROSS-REFERENCE TO RELATED APPLICATIONS

The disclosure of Japanese Patent Application No. 2010-248648 filed on Nov. 5, 2010 including the specification, drawings, and abstract is incorporated herein by reference in its entirety.

BACKGROUND

The present invention relates to an image sensor, especially, to an image sensor provided with plural pixel circuits arranged in plural rows and plural columns.

In the past, a general camera was dominated by a film type camera, however, in recent days, it has been replaced with a digital type camera. The image quality of a digital camera has been improved remarkably, and the newest model digital camera outperforms the film camera. An image sensor of a CCD system or a CMOS system is mounted in the digital camera.

Generally, the image sensor is provided with a pixel array unit, a vertical scanning circuit, a voltage level shift circuit, a column circuit, a horizontal scanning circuit, an output circuit, and a timing generator (for example, refer to Patent Literature 1). The pixel array unit includes plural pixels arranged in the shape of a matrix. Each pixel converts incident light into an electrical signal. The scanning circuit selects each pixel according to a control signal from the timing generator, and the electrical signal generated by each pixel is read via the column circuit, and is outputted to the exterior of the output circuit.

The vertical scanning circuit is configured with an address decoder etc., performs a selection scan of pixels of the pixel array unit in units of rows, based on the address signal supplied from the timing generator, and outputs plural control signals (a transfer signal, a reset signal, and a selection signal) of a logic circuit level to the selected line. The voltage level shift circuit supplies the control signals of the logic circuit level outputted from the vertical scanning circuit to plural pixels of the selected line via the control signal line, after a voltage of the control signals is shifted to the voltage of a pixel driving level.

In an image sensor of the CMOS system, a rolling electronic shutter system is adopted at the time of dynamic image photography. In the rolling electronic shutter system, it is necessary to select a read row and a shutter row (pixel reset row) which are mutually different, in the same one horizontal period (refer to FIG. 8). In order to fully send out a charge (electron) accumulated on a pixel, a pixel reset may be performed plural times, and plural addresses may have to be selected. Therefore, the vertical scanning circuit includes a read address decoder and plural reset address decoders.

Each address decoder includes a row selection decoder and a forming circuit. The row selection decoder selects a row corresponding to the address supplied from the timing generator. The forming circuit generates a control signal, based on a row selection signal which indicates the selected row and on a forming signal which sets up the timing to activate the selected row.

In Patent Literature 2, the circuit scale of a driving unit in an image sensor for performing parallel control of plural rows in a pixel array is suppressed. Specifically, plural row control signals are generated corresponding to plural bits at an active level in a decode signal stored in the storage unit, and are outputted to plural rows of a pixel array in parallel. Accordingly, it is possible to perform parallel control of plural rows by a single driving unit (a vertical scanning circuit); therefore, the circuit scale of the driving unit is suppressed.

Patent Literature (Patent Literature 1) Japanese Patent Laid-open No. 2007-13245
(Patent Literature 2) Japanese Patent Laid-open No. 2010-183458

SUMMARY

Although the circuit area reduction of an image sensor has been studied in related art, the demand of the area reduction is still high in an image sensor and further circuit area reduction is necessary.

For that reason, the principal purpose of the present invention is to provide an image sensor with a small circuit area.

An image sensor according to the present invention comprises: plural pixel circuits arranged in plural rows and plural columns, each of which is controlled by plural control signals and converts incident light into an electrical signal; a pixel array which includes plural horizontal signal lines each provided corresponding to each row in order to transfer the plural control signals, and plural vertical signal lines respectively provided corresponding to the plural columns; a selection circuit which is able to select one of the plural rows; a control signal generating circuit which is provided corresponding to each control signal and is able to supply, via a horizontal signal line corresponding to a row selected by the selection circuit, a corresponding control signal to each of the plural pixel circuits of the row; and a read circuit which is able to read plural electrical signals outputted to the plural vertical signal lines from the plural pixel circuits of the row selected by the selection circuit. The control signal generating circuit includes: a logic circuit which is provided corresponding to each row and is able to set a first signal to a selection level when the corresponding row is selected by the selection circuit, and is able to set the first signal to a non-selection level when the corresponding row is not selected by the selection circuit; a latch circuit which is provided corresponding to each row and is able to set a second signal to an activation level after being set when the corresponding first signal is set to the selection level, and is able to set the second signal to a deactivation level after being reset by a reset signal; a forming signal generating circuit which is able to generate a forming signal in synchronization with the selection circuit; and a gate circuit which is provided corresponding to each row and is able to supply the forming signal to a horizontal signal line of the corresponding row as a corresponding control signal when the corresponding second signal is set to the activation level. The selection level of the first signal is a first power supply voltage, and the activation level of the second signal is a second power supply voltage higher than the first power supply voltage. The latch circuit serves also as a voltage level shift circuit which is able to transform the voltage level of the first signal from the first power supply voltage to the second power supply voltage and is able to output the transformed first signal as the second signal.

In the image sensor according to the present invention, the latch circuit is provided corresponding to each row. Therefore, plural rows can be selected by setting plural latch circuits. Consequently, even when realizing a rolling electronic shutter, plural row selection decoders are unnecessary. Moreover, the latch circuit serves also as a voltage level shift circuit. Therefore, it is possible to reduce the number of elements and to attain the circuit area reduction.

BRIEF DESCRIPTION OF THE DRAWINGS

FIG. 6 is a circuit diagram illustrating a configuration of a TX decoder illustrated in FIG. 4;

FIG. 7 is a timing chart illustrating read operation of the control circuit and the TX decoder illustrated in FIG. 5 and FIG. 6, respectively;

FIG. 8 is a timing chart for explaining a rolling electronic shutter system;

FIG. 9 is a timing chart illustrating rolling electronic shutter operation in the image sensor illustrated in FIGS. 1-7;

FIG. 13 shows a table illustrating the correspondence relation of an address and a signal in the pixel array illustrated in FIG. 12;

FIG. 26 (a) and FIG. 26 (b) are tables illustrating a variable address degeneration function in the image sensor illustrated in FIGS. 20-24;

FIG. 27 is a timing chart illustrating hybrid electronic shutter operation when the variable address degeneration function illustrated in FIG. 26 is used;

DETAILED DESCRIPTION

Embodiment 1

Figure 1:
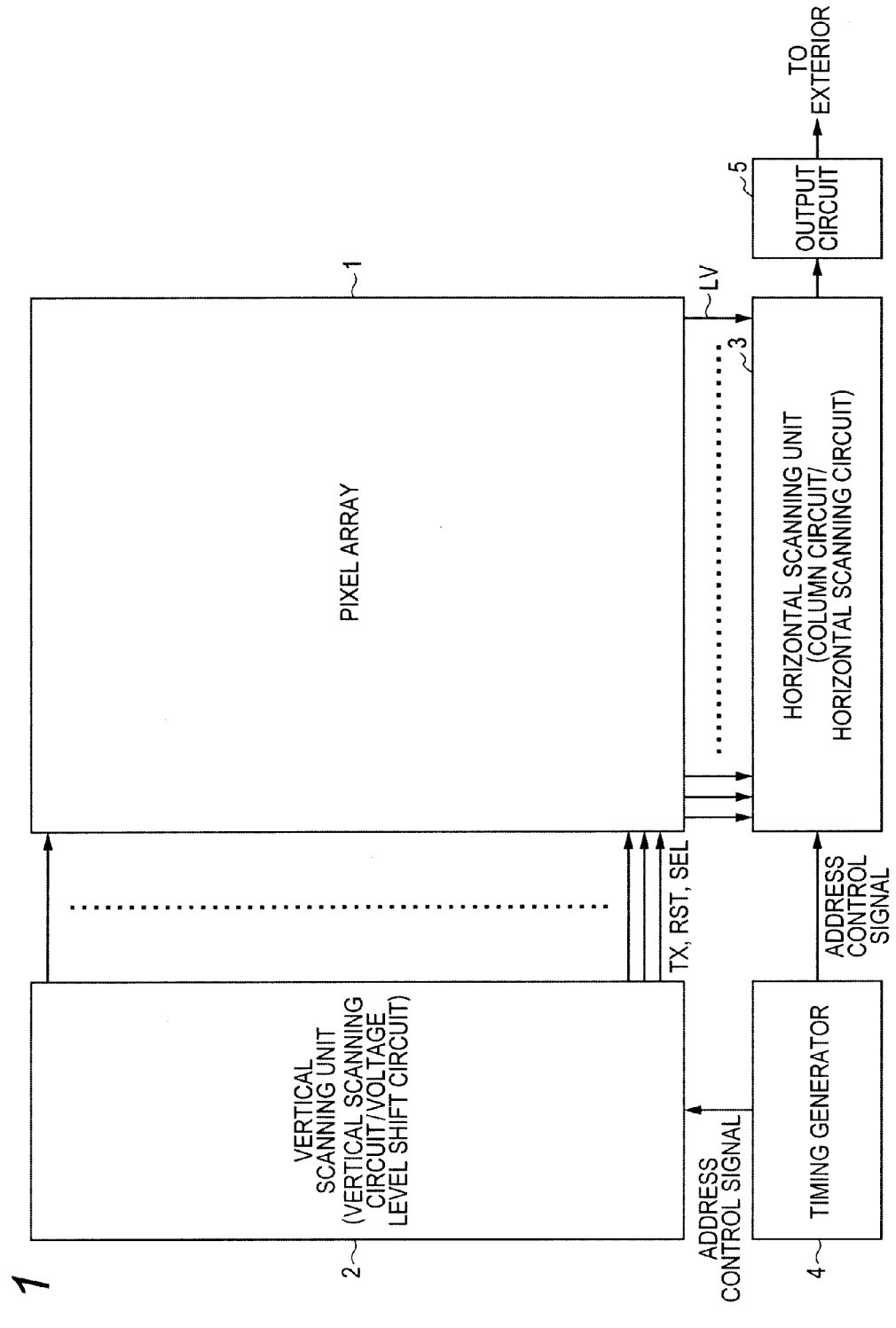
FIG. 1 is a block diagram illustrating a configuration of an image sensor according to Embodiment 1 of the present invention.
Figure 2:
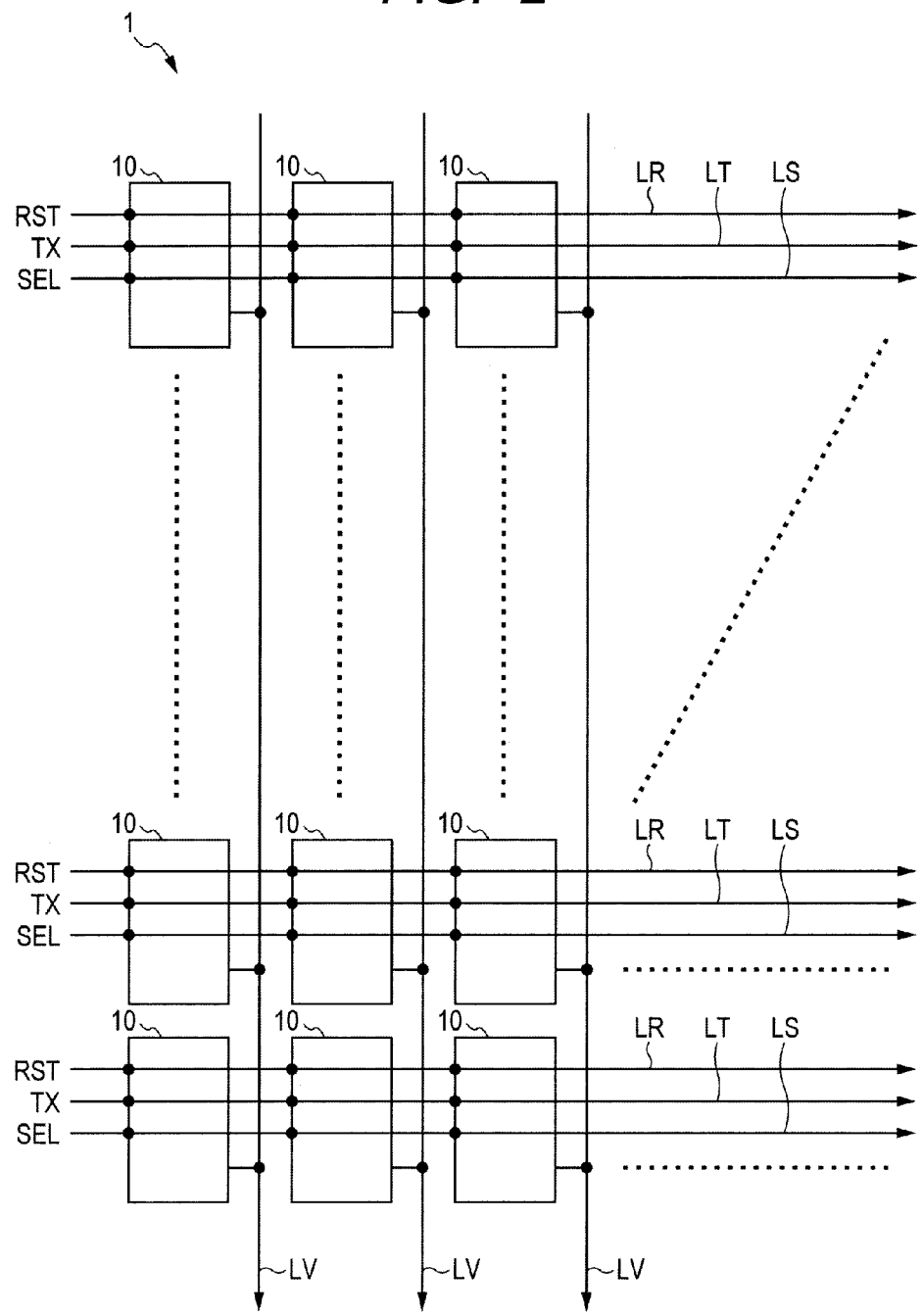
FIG. 2 is a block diagram illustrating a configuration of a pixel array illustrated in FIG. 1.

As illustrated in FIG. 1, an image sensor according to Embodiment 1 of the present invention comprises a pixel array 1, a vertical scanning unit 2, a horizontal scanning unit 3, a timing generator 4, and an output circuit 5. The pixel array 1 includes, as illustrated in FIG. 2, plural pixel circuits 10 arranged in plural rows and plural columns, three horizontal signal lines LR, LT, and LS, provided corresponding to each row, and plural vertical signal lines LV, each provided corresponding to each column.

Three horizontal signal lines LR, LT, and LS are provided in order to transfer a reset signal RST, a transfer signal TX, and a selection signal SEL, from the vertical scanning unit 2, respectively. The vertical signal line LV is provided in order to transfer an electrical signal outputted from the pixel circuit 10 of the corresponding column to the horizontal scanning unit 3.

Figure 3:
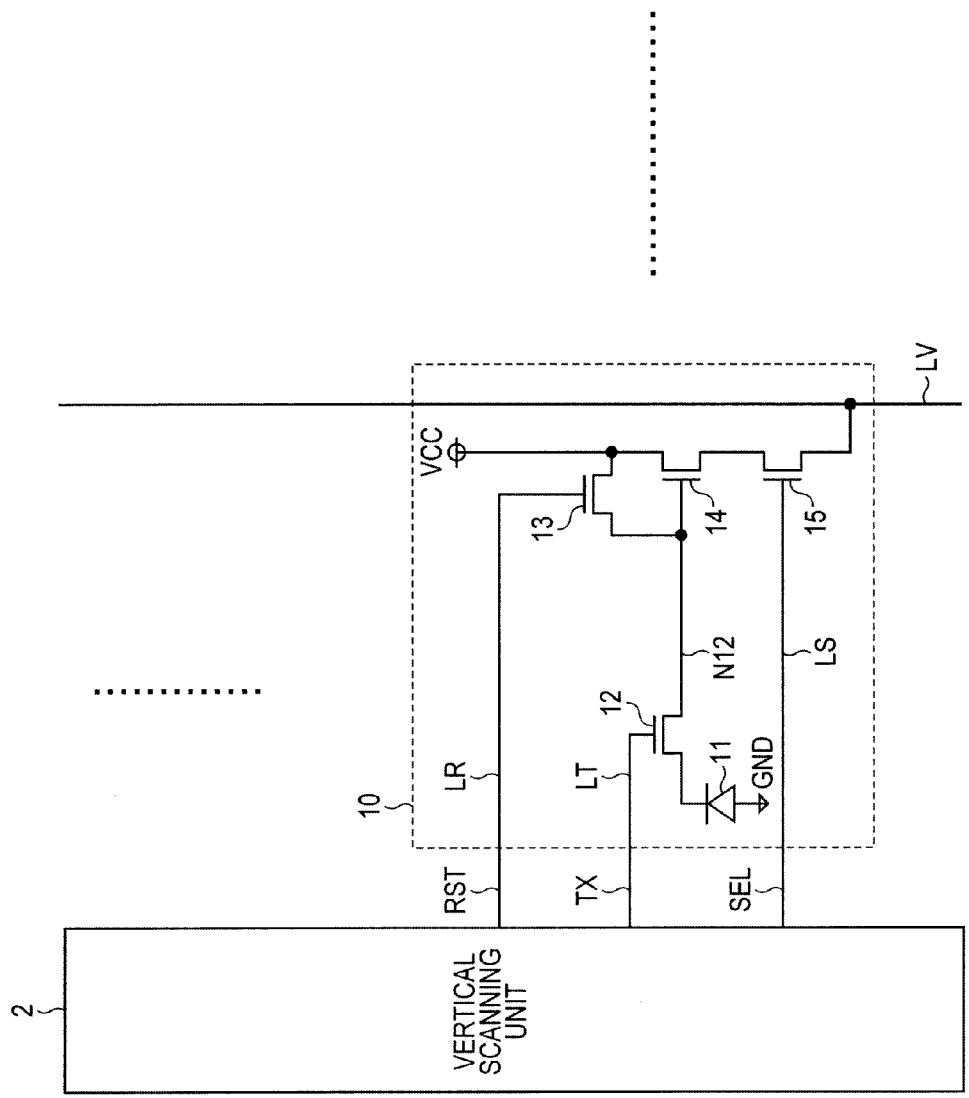
FIG. 3 is a circuit diagram illustrating a configuration of a pixel circuit illustrated in FIG. 2.

Each pixel circuit 10 includes, as illustrated in FIG. 3, a photodiode 11, a transfer transistor 12, a reset transistor 13, an amplification transistor 14, and a select transistor 15. The photodiode 11 stores a minus electric charge of quantity corresponding to the intensity of incident light. An anode of the photodiode 11 receives a ground voltage GND, and a cathode thereof is coupled to a gate (a node N12) of the amplification transistor 14 via the transfer transistor 12. A gate of the transfer transistor 12 is coupled to the corresponding horizontal signal line LT to receive a transfer signal TX.

The amplification transistor 14 and the select transistor 15 are coupled in series between a line of a power supply voltage VCC and the corresponding vertical signal line LV. A gate of the select transistor 15 is coupled to the corresponding horizontal signal line LS to receive a selection signal SEL. The reset transistor 13 is coupled between the line of the power supply voltage VCC and a gate of the amplification transistor 14. A gate of the reset transistor 13 is coupled to the corresponding horizontal signal line LR to receive a reset signal RST.

In shutter (reset) operation, the transfer signal TX and the reset signal RST are set to an "H" level and the transistors 12 and 13 are set to "ON"; accordingly, the minus electric charge stored in the photodiode 11 is reset. When the transfer signal TX and the reset signal RST are set to an "L" level and the transistors 12 and 13 are set to "OFF", a charge of quantity corresponding to the intensity of incident light is stored in the photodiode 11.

In read operation, the selection signal SEL is set to an "H" level, and the select transistor 15 is set to "ON". Next, the reset signal RST is set to an "H" level only for a prescribed time and the reset transistor 13 is set to "ON"; accordingly, the node N12 is reset to a voltage lower than the power supply voltage VCC by the threshold voltage of the reset transistor 13. A dark signal (reference signal) is generated based on the current which flows through the transistors 14 and 15 at this time. Subsequently, the transfer signal TX is set to an "H" level only for a prescribed time and the transfer transistor 12 is set to "ON", and the cathode of the photodiode 11 is coupled to the node N12. A light signal is generated based on the current which flows through the transistors 14 and 15 at this time. The light signal is compensated by the dark signal.

Returning to FIG. 1, the timing generator 4 supplies the vertical scanning unit 2 with a row selection address signal and a control signal, and supplies the horizontal scanning unit 3 with a column selection address signal and a control signal. The vertical scanning unit 2 functions as a vertical scanning circuit and a voltage level shift circuit as well. According to the row selection address signal and the control signal, the vertical scanning unit 2 selects sequentially plural rows of the pixel array 1, and supplies each pixel circuit 10 of the selected row with a reset signal RST, a transfer signal TX, and a selection signal SEL, via horizontal signal lines LR, LT, and LS of the selected row.

The horizontal scanning unit 3 functions as a column circuit and a horizontal scanning circuit. The horizontal scanning unit 3 converts current outputted to plural vertical signal lines LV from plural pixel circuits 10 of the row selected by the vertical scanning unit 2, into plural light signals (or plural dark signals). The output circuit 5 outputs outside the plural light signals and plural dark signals which are generated by the horizontal scanning unit 3.

Figure 4:
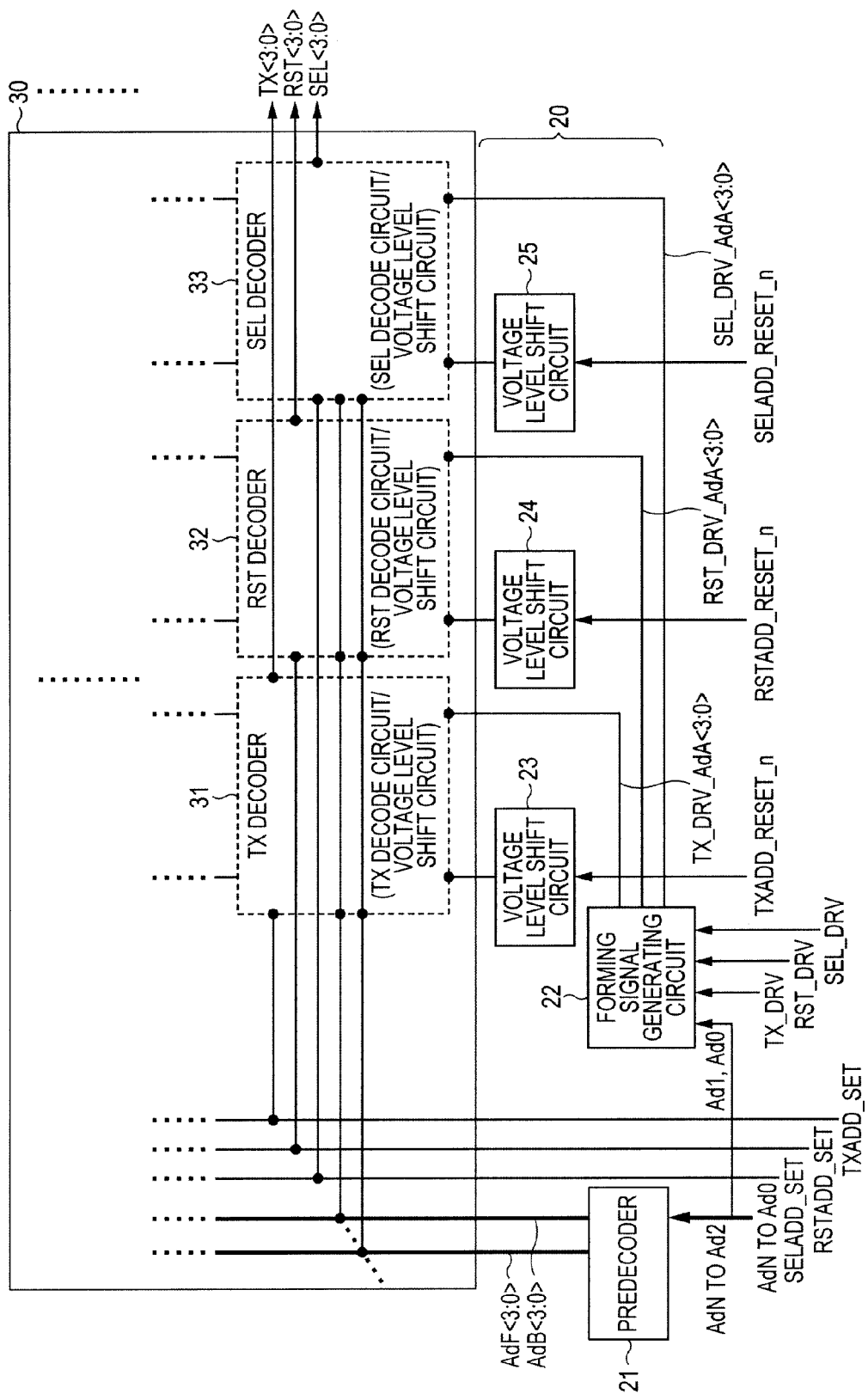
FIG. 4 is a block diagram illustrating a configuration of a vertical scanning unit illustrated in FIG. 1.

FIG. 4 is a block diagram illustrating a configuration of the vertical scanning unit 2. In FIG. 4, the vertical scanning unit 2 is supplied, from the timing generator 4, with a row selection address signal AdN-Ad0, address-based latch set signals TXADD_SET, RSTADD_SET, and SELADD_SET, all-latches reset signals TXADD_RESET_n, RSTADD_RESET_n, and SELADD_RESET_n, and forming signals TX_DRV, RST_DRV, and SEL_DRV. Plural rows of the pixel array 1 are divided in advance into plural row groups each having four rows.

The vertical scanning unit 2 is provided with a control circuit 20 and a signal generating circuit 30. The control circuit 20 includes a predecoder 21, a forming signal generating circuit 22, and voltage level shift circuits 23-25. The signal generating circuit 30 includes a TX decoder 31, an RST decoder 32, and an SEL decoder 33 which are provided corresponding to each row group.

Here, the pixel array 1 and the peripheral circuits including the timing generator 4 operate with a power supply voltage of a different value. In the pixel array 1, a high power supply voltage is necessary in order to obtain the saturation amount of electrons which is related to the performance. In the peripheral circuit, on the other hand, when the power supply voltage is designed to be low, fine-line processes can be employed. By this arrangement, it becomes possible to reduce the power consumption and the occupied area. Therefore, a voltage level shifter circuit is necessary in the vertical scanning unit 2.

The predecoder 21 predecodes a row selection address signal AdN-Ad2, and generates predecode signals AdB<3:0>-AdF<3:0>, - - - . For example, one of four predecode signals AdF<3:0> (for example, AdF<3>) is alone set to an "H" level, and the other three remaining signals AdF<2:0> are set to an "L" level.

One signal AdB of the signals AdB<3:0> and one signal AdC of the signals AdC<3:0>, one signal AdD of the signals AdD<3:0>, etc. (the same in the following) are assigned to each row group in advance. That is, a unique row selection address signal AdN-Ad2 is assigned to each row group in advance. When a certain row selection address signal AdN-Ad2 is inputted, all of the predecode signals AdB-AdF, - - - of a row group to which the row selection address signal AdN-Ad2 is assigned are set to an "H" level, and the row group is selected.

The forming signal generating circuit 22 supplies to the decoders 31-33 logical product signals of the forming signals TX_DRV, RST_DRV, and SEL_DRV, and four signals obtained by predecoding the lower-order 2-bit signal Ad1-Ad0 of the address signal, as address forming signals TX_DRV_AdA<3:0>, RST_DRV_AdA<3:0>, and SEL_DRV_AdA<3:0>, respectively. Since only one signal among the four signals obtained by predecoding the signal Ad1-Ad0 is set as "H" level, only one signal of the address forming signals TX_DRV_AdA<3:0> is driven, only one signal of the address forming signals RST_DRV_AdA<3:0> is driven, and only one signal of the address forming signals SEL_DRV_AdA<3:0> is driven.

The voltage level shift circuit 23 performs the level shift of the voltage of the all-latches reset signal TXADD_RESET_n, and supplies it to the TX decoder 31. The voltage level shift circuit 24 performs the level shift of the voltage of the all-latches reset signal RSTADD_RESET_n, and supplies it to the RST decoder 32. The voltage level shift circuit 25 performs the level shift of the voltage of the all-latches reset signal SELADD_RESET_n, and supplies it to the SEL decoder 33.

The TX decoder 31 is set in response to the fact that the corresponding row group has been selected by the predecode signals AdB<3:0>-AdF<3:0>, - - - , and the fact that the set signal TXADD_SET has been set to an "H" level as an activation level. The TX decoder 31 then generates transfer signals TX<3:0> for four rows by performing the level shift of the address forming signals TX_DRV_AdA<3:0>. The TX decoder 31 is reset in response to the fact that the reset signal TXADD_RESET_n has been set to an "L" level as an activation level.

The RST decoder 32 is set in response to the fact that the corresponding row group has been selected by the predecode signals AdB<3:0>-AdF<3:0>, - - - , and the fact that the set signal RSTADD_SET has been set to an "H" level as an activation level. The RST decoder 32 then generates reset signals RST<3:0> for four rows by performing the level shift of the address forming signals RST_DRV_AdA<3:0>. The RST decoder 32 is reset in response to the fact that the reset signal RSTADD_RESET_n has been set to an "L" level as an activation level.

The SEL decoder 33 is set in response to the fact that the corresponding row group has been selected by the predecode signals AdB<3:0>-AdF<3:0>, - - - , and the fact that the set signal SELADD_SET has been set to an "H" level as an activation level. The SEL decoder 33 then generates selection signals SEL<3:0> for four rows by performing the level shift of the address forming signals SEL_DRV_AdA<3:0>. The SEL decoder 33 is reset in response to the fact that the reset signal SELADD_RESET_n has been set to an "L" level as an activation level.

Figure 5:
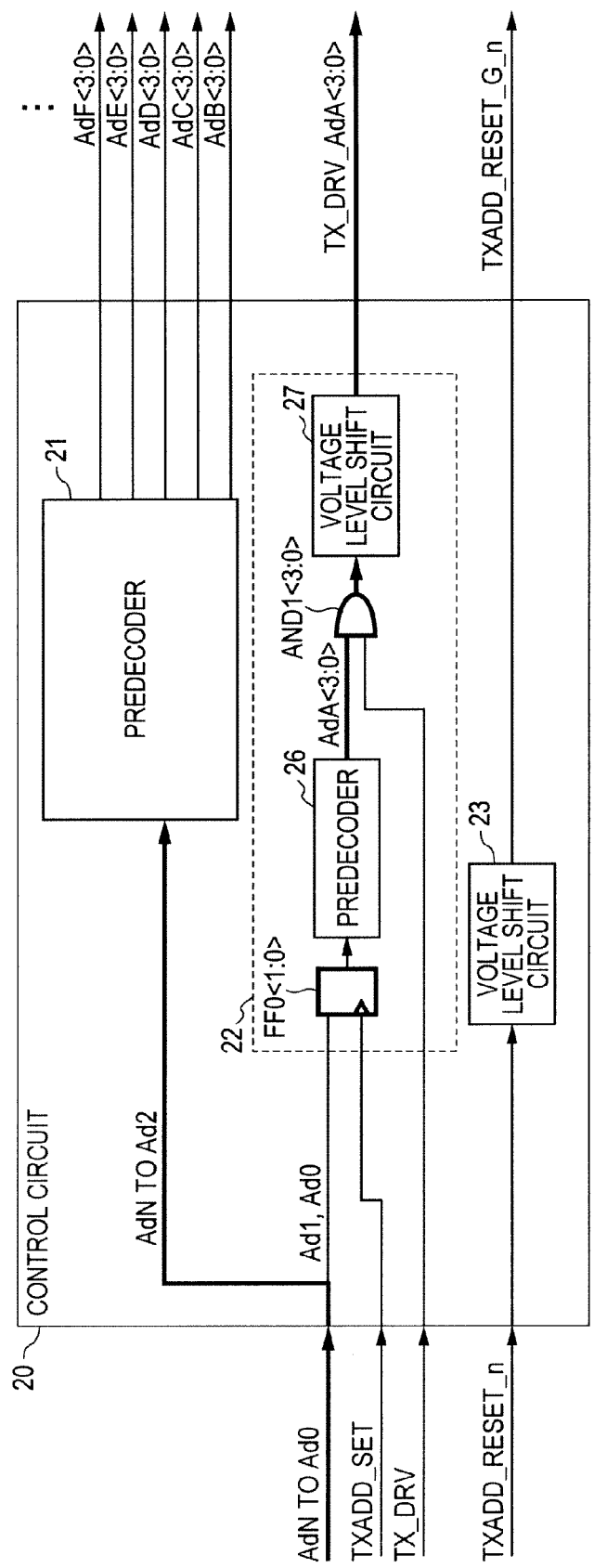
FIG. 5 is a circuit block diagram illustrating a configuration of a control circuit illustrated in FIG. 4.

FIG. 5 is a circuit block diagram illustrating a part of the control circuit 20, the part being relevant to the generation of the transfer signal TX. In FIG. 5, the control circuit 20 is provided with a predecoder 21, a forming signal generating circuit 22, and a voltage level shift circuit 23. The forming signal generating circuit 22 includes a memory device FF0<1:0>, a predecoder 26, a logical product circuit AND1<3:0>, and a voltage level shift circuit 27.

The control circuit 20 is supplied, from the timing generator 4, with a row selection address signal AdN-Ad0 (N is a positive integer), an address-based latch set signal TXADD_SET, an all-latches reset signal TXADD_RESET_n, and a forming signal TX_DRV.

In the present image sensor, a block division system and an address signal predecode system are used because the number of bits of the address signal is large. The predecoder 21 generates predecode signals AdB<3:0>, AdC<3:0>, AdD<3:0>, - - -, by predecoding, for every 2 bits, the higher-order address signal AdN-Ad2 excluding the lower-order 2-bit signal Ad1-Ad0 of the row selection address signal AdN-Ad0.

The memory device FF0<1:0> of the forming signal generating circuit 22 stores the lower-order 2-bit signal Ad1-Ad0 of the address signal at a rising time of the address-based latch set signal TXADD_SET. Since the time when the lower-order 2-bit signal Ad1-Ad0 of the address signal is supplied (the time when the address-based latch set signal TXADD_SET is enabled) and the time when the signal is necessary (the time when the forming signal TX_DRV is enabled) are different, the memory device FF0<1:0> is necessary.

The predecoder 26 generates four predecode signals AdA<3:0> by predecoding the lower-order 2-bit signal Ad1-Ad0 of the address signal fetched to the memory device FF0<1:0>. The logical product circuit AND1<3:0> generates logical product signals of the predecode signals AdA<3:0> and the forming signal TX_DRV, respectively. The voltage level shift circuit 27 generates four address forming signals TX_DRV_AdA<3:0> by performing voltage conversion of the output signal of the logical product circuit AND1<3:0>. Since only one signal of the predecode signals AdA<3:0> is set to an "H" level, only one signal of the four address forming signals TX_DRV_AdA<3:0> is driven.

The "H" level and the "L" level of each of the row selection address signal AdN-Ad0, the address-based latch set signal TXADD_SET, the all-latches reset signal TXADD_RESET_n, and the forming signal TX_DRV, supplied from the timing generator 4, are the power supply voltage VDD and the ground voltage GND, respectively. The voltage level shift circuit 23 generates an all-latches reset signal TXADD_RESET_G_n by converting the "H" level of the all-latches reset signal TXADD_RESET_n from the power supply voltage VDD to a power supply voltage VTXH higher than the power supply voltage VDD.

The voltage level shift circuit 27 converts the "H" level of the output signal of the logical product circuit AND1<3:0> from the power supply voltage VDD to the power supply voltage VTXH, and the "L" level of the output signal of the logical product circuit AND1<3:0> from the ground voltage GND to a negative voltage VTXL lower than the ground voltage GND, and generates four address forming signals TX_DRV_AdA<3:0>.

FIG. 6 is a circuit diagram illustrating a configuration of the TX decoder 31. In FIG. 6, the TX decoder 31 includes a row selection decoder circuit 35, a level shifter 36, a forming circuit 37, and an output buffer 38. The row selection decoder circuit 35 includes logical product circuits AND2-AND4, N-channel MOS transistors Q0 and Q1, a P-channel MOS transistor P0, and inverters INV0 and INV1.

To each row group, one signal AdF of the signals AdF<3:0>, one signal AdE of the signals AdE<3:0>, one signal AdD of the signals AdD<3:0>, one signal AdC of the signals AdC<3:0>, and one signal AdB of the signals AdB<3:0> are assigned in advance.

To each row group, one signal AdB of the signals AdB<3:0>, one signal AdC of the signals AdC<3:0>, one signal AdD of the signals AdD<3:0>, etc. (the same in the following) are assigned in advance. That is, a unique row selection address signal AdN-Ad2 is assigned to each row group in advance.

When a certain row selection address signal AdN-Ad2 is inputted, all of the predecode signals AdB-AdF, - - - of the row group to which the row selection address signal AdN-Ad2 has been assigned are set to an "H" level, and the row group is selected.

The logical product circuit AND2 sets a block selection signal BS to an "H" level as a selection level, when all of the signals AdD, AdE, AdF, - - - assigned in advance are set to an "H" level. The logical product circuit AND3 outputs a logical product signal of the block selection signal BS, the signal AdB assigned in advance, and the address-based latch set signal TXADD_SET. The logical product circuit AND4 outputs a logical product signal of the block selection signal BS and the signal AdC assigned in advance.

The N-channel MOS transistors Q0 and Q1 are coupled in series between a node N1 and the line of the ground voltage GND, and the gates thereof receive the output signals of the logical product circuits AND3 and AND4, respectively. The P-channel MOS transistor P0 is coupled between the line of the power supply voltage VTXH and the node N1, and the gate thereof receives the output signal TXADD_RESET_G_n of the voltage level shift circuit 23.

The inverter INV0 is coupled between the node N1 and a node N2, and outputs to the node N2 an inverted signal of the signal appearing at the node N1. The inverter INV1 is coupled between the node N2 and the node N1, and outputs to the node N1 an inverted signal of the signal appearing at the node N2. The inverters INV0 and INV1 are driven by the power supply voltage VTXH and the ground voltage GND. The transistors Q0, Q1, and P0 and the inverters INV0 and INV1 compose a settable/resettable latch circuit.

When both of the output signals of the logical product circuits AND3 and AND4 are set to an "H" level, the N-channel MOS transistors Q0 and Q1 become conductive, and the node N1 is set to an "L" level (the ground voltage GND). Accordingly, the latch circuit is set and the node N2 is set to an "H" level (the power supply voltage VTXH).

When the N-channel MOS transistors Q0 and Q1 are non-conductive and the reset signal TXADD_RESET_G_n is set to an "L" level, the P-channel MOS transistor P0 becomes conductive, and the node N1 is set to an "H" level. Accordingly, the latch circuit is reset and the node N2 is set to an "L" level (the ground voltage GND). Therefore, the latch circuit serves also as a voltage level shift circuit which converts the "H" level of a signal from the power supply voltage VDD into the power supply voltage VTXH.

The level shifter 36 includes an inverter INV2, P-channel MOS transistors P1 and P2, and N-channel MOS transistors Q2-Q5. The transistors P1, Q2, and Q3 are coupled in series between the line of the power supply voltage VTXH and the line of the negative voltage VTXL. The transistors P2, Q4, and Q5 are coupled in series between the line of the power supply voltage VTXH and the line of the negative voltage VTXL. A signal appearing at the node N2 is supplied to gates of the transistors P1 and Q2 directly, and to gates of the transistors P2 and Q4 after inverted by the inverter INV2. The inverter INV2 is driven by the power supply voltage VTXH and the ground voltage GND. A node between the transistor P1 and the transistor Q2 is coupled to a gate of the transistor Q5. A node N3 between the transistor P2 and the transistor Q4 is coupled to a gate of the transistor Q3. The node N3 serves as an output node of the level shifter 36.

When the node N2 is at an "L" level, the transistors P1, Q4, and Q5 are conductive and the transistors P2, Q2, and Q3 are non-conductive, and the node N3 is set to an "L" level (the negative voltage VTXL). When the node N2 is at an "H" level, the transistors P2, Q2, and Q3 are conductive and the transistors P1, Q4, and Q5 are non-conductive, and the node N3 is set to an "H" level (the power supply voltage VTXH).

The level shifter 36 is provided because, in order to decrease the dark current of the photodiode 11 with respect to the transfer signal TX, it is necessary to suppress occurrence of the dark current from the underneath of the gate of the transfer transistor 12, by supplying a negative voltage to the gate and bringing the transfer transistor 12 into a non-conductive state. Since it is not necessary to supply a negative voltage with respect to the reset signal RST and the selection signal SEL, the level shifter 36 is unnecessary in the RST decoder 32 and the SEL decoder 33.

The forming circuit 37 includes four logical product circuits AND5<3:0>. Each of the logical product circuits AND5<3:0> is driven by the power supply voltage VTXH and the negative voltage VTXL. The logical product circuits AND5<3:0> generate logical product signals of an output signal of the level shifter 36 (a signal which appears at the node N3) and the forming signals TX_DRV_AdA<3:0> generated by the forming signal generating circuit 22.

The output buffer 38 includes four buffers BUF1<3:0>. Each of the buffers BUF1<3:0> is driven by the power supply voltage VTXH and the negative voltage VTXL. Output signals of the logical product circuits AND5<3:0> are enhanced by the buffers BUF1<3:0>, and serve as the transfer signals TX<3:0>. The transfer signals TX<3:0> are supplied to four horizontal signal lines LT of the corresponding row group.

Each of regions A, B, and C surrounded with dotted-line quadrangles as illustrated in FIG. 6 is a region where the same power supply voltage is applied. Circuits of the region A are driven by the power supply voltage VDD and the ground voltage GND. Circuits of the region B are driven by the power supply voltage VTXH and the ground voltage GND. Circuits of the region C are driven by the power supply voltage VTXH and the negative voltage VTXL.

FIG. 7 is a timing chart illustrating the transfer signals TX<3:0> in read operation. In FIG. 7, the read operation includes Step S1 which sets the latch circuit including the inverters INV0 and INV1, Step S2 which forms the signal TX, and Step S3 which resets the latch circuit.

At Step S1, the address-based latch set signal TXADD_SET is enabled, and a latch circuit of a row group selected by the address signal AdN-Ad2 excluding the lower-order 2 bits is set (the latch circuit is set to a selected state). At the same time, in the memory device FF0<1:0> of the forming signal generating circuit 22, the lower-order 2-bit address signal Ad1-Ad0 is stored. When the latch circuit is set, one input node N3 of the four logical product circuits AND5<3:0> of the forming circuit 37 is set to an "H" level.

At Step S2, one signal of the transfer signals selected by the address (TX<0> in read of the zeroth row) is driven, by asserting and negating the forming signal TX_DRV. One signal of the forming signals TX_DRV_AdA<3:0>, selected by the lower-order 2-bit address signal Ad1-Ad0 stored in the memory device FF0<1:0> of the forming signal generating circuit 22, operates in phase with the forming signal TX_DRV, and is outputted to the corresponding horizontal signal line LT via the forming circuit 37 and the output buffer 38.

At Step S3, the all-latches reset signal TXADD_RESET_n is enabled to reset the latch circuit of the selected row group (the latch circuit is set to a not-selected state), in preparation for operation of the next row. Three Steps S1-S3 described above are repeated for every row by incrementing by one (+1) the row selection address signal AdN-Ad0.

The RST decoder 32 and the SEL decoder 33 are the same as the TX decoder 31 in configuration. However, in the RST decoder 32 and the SEL decoder 33, the level shifter 36 is unnecessary and the signal which appears at the node N2 is supplied to the forming circuit 37 as it is. The forming circuit 37 and the output buffer 38 are driven by the power supply voltage VTXH and the ground voltage GND.

(A Rolling Electronic Shutter System)

FIG. 8 is a timing chart illustrating a rolling electronic shutter system in the present image sensor. In the rolling shutter system illustrated in FIG. 8, all the pixel rows are reset sequentially, on a row-by-row basis, from time t0 for example. An electrical signal of all the pixel rows is read sequentially, on a row-by-row basis, from time t1 before all the pixel rows are reset. A period from time t0 to time t1 is exposure time.

In the rolling electronic shutter system, it is necessary to select two different rows, a read row and a shutter row (pixel reset row), in the same one horizontal period. In the example illustrated in FIG. 8, it is necessary to select a read row 1 and a shutter (pixel reset) row 2, in one horizontal period which corresponds to time t4. In order to fully send out a charge (electron) accumulated on a pixel, a pixel reset may be performed several times. In this case, it is necessary to select plural shutter rows.

FIG. 9 is a timing chart for the rolling electronic shutter system in the image sensor illustrated in FIGS. 1-7. In FIG. 9, a read row and a shutter row (pixel reset row) are selected in the same one horizontal period within one horizontal period. The rolling electronic shutter system in one horizontal period is divided into five Steps S11-S15.

At Step S11, a latch circuit of a row corresponding to a read address XR is set. That is, as illustrated in (a)-(d) of FIG. 9, a row selection address signal AdN-Ad0 indicating the read address XR is supplied, and set signals TXADD_SET, RSTADD_SET, and SELADD_SET are set to an "H" level for a prescribed time, to set a latch circuit of a row corresponding to the read address XR (time t1).

At Step S12, each signal corresponding to the read is formed. That is, as illustrated in (h)-(m) of FIG. 9, forming signals TX_DRV, RST_DRV, and SEL_DRV for the read are generated, and a transfer signal TX<XR>, a reset signal RST<XR>, and a selection signal SEL<XR> are outputted. The selection signal SEL<XR> is set to an "H" level at time t2-t7. The reset signal RST<XR> is set to an "H" level at time t3-t4. The transfer signal TX<XR> is set to an "H" level at time t5-t6.

When the selection signal SEL<XR> is set to an "H" level (time t2), the select transistor 15 of the pixel circuit 10 illustrated in FIG. 3 becomes conductive. When the reset signal RST<XR> is set to an "H" level (time t3), the reset transistor 13 of the pixel circuit 10 becomes conductive, and the node N12 is reset to the power supply voltage VCC. When the reset signal RST<XR> is set to an "L" level (time t4), the reset transistor 13 becomes non-conductive. Then, a dark current flows from the line of the power supply voltage VCC to the vertical signal line LV via the transistors 14 and 15, and the dark signal is read.

When the transfer signal TX<XR> is set to an "H" level (time t5), the transfer transistor 12 becomes conductive and a voltage corresponding to a charge generated in the photodiode 11 appears at the node N12. When the transfer signal TX<XR> is set to an "L" level (time t6), the transfer transistor 12 becomes non-conductive, then the photoelectric current of a value corresponding to the voltage of the node N12 flow from the line of the power supply voltage VCC to the vertical signal line LV via the transistors 14 and 15, and a light signal is read. When the selection signal SEL<XR> is set to an "L"

level (time t7), the select transistor 15 becomes non-conductive and the read operation is completed.

At Step S13, a latch circuit for the transfer signal TX and the reset signal RST which correspond to the shutter address XS is set. That is, as illustrated in (a)-(c) of FIG. 9, the row selection address signal AdN-Ad0 which indicates the shutter address XS is supplied, and the set signals TXADD_SET and RSTADD_SET are set at an "H" level for a prescribed time, and the latch circuit of the row corresponding to the shutter address XS is set (time t8).

At Step S14, the transfer signal TX and the reset signal RST are formed. That is, as illustrated in (h), (i), (n), and (o) of FIG. 9, the forming signals TX_DRV and RST_DRV for shutter operation are generated, and the transfer signal TX<XS> and the reset signal RST<XS> are outputted. The reset signal RST<XS> is set to an "H" level at time t9-t12. The transfer signal TX<XS> is set to an "H" level at time t10-t11.

When the reset signal RST<XS> and the transfer signal TX<XS> are set to an "H" level (time t9, t10), the transistors 12 and 13 of the pixel circuit 10 become conductive, and the minus electric charge generated in the photodiode 11 is removed and the photodiode 11 is reset. When the reset signal RST<XS> and the transfer signal TX<XS> are set to an "L" level (time t11, t12), the transistors 12 and 13 of the pixel circuit 10 become non-conductive, and storing a minus electric charge is resumed in the photodiode 11.

At Step S15, the latch circuit of each signal is reset. That is, as illustrated in (e)-(g) of FIG. 9, the reset signals TXADD_RESET_n, RSTADD_RESET_n, and SELADD_RESET_n are set to an "L" level, and all the latch circuits are reset (time t14).

As illustrated in (k) and (l) of FIG. 9, at Step S14, the transfer signal TX and the reset signal RST are driven also in the read row; however, there is no problem because the read operation is already terminated.

(A Hybrid Electronic Shutter System)

As a system which determines an exposure time in a CMOS system image sensor, there exist a mechanical shutter system, a rolling electronic shutter system, and a hybrid electronic shutter system which combines both systems. The hybrid electronic shutter system performs an exposure start by an electronic shutter and an exposure end by a mechanical shutter. Generally, the mechanical shutter system is employed for photography of a still image, and the rolling electronic shutter system is employed for photography of a dynamic image. However, it is possible to employ the rolling electronic shutter system for photography of a still image as well. In photography of a still image, the hybrid electronic shutter system possesses an advantage which the mechanical shutter system and the rolling electronic shutter system do not possess.

Figure 10A:
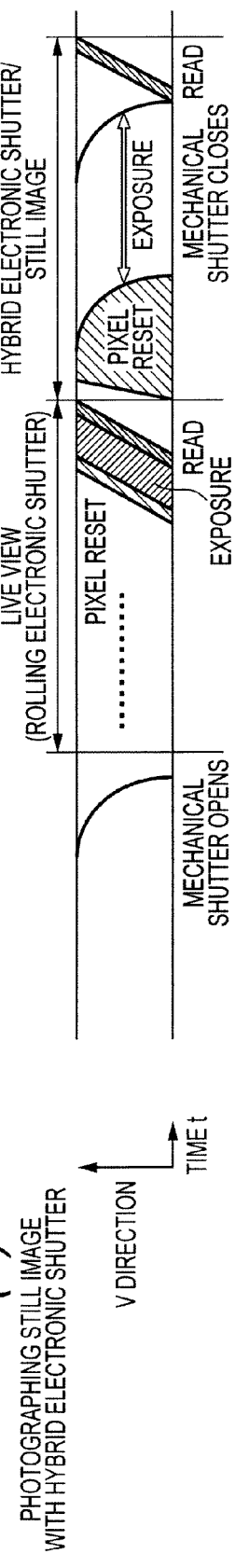
FIGS. 10 (a), 10 (b), and 10 (c) are timing charts which illustrate a photographing method of a still image by a hybrid electronic shutter, an ordinary mechanical shutter, and a rolling electronic shutter, respectively.
Figure 10B:
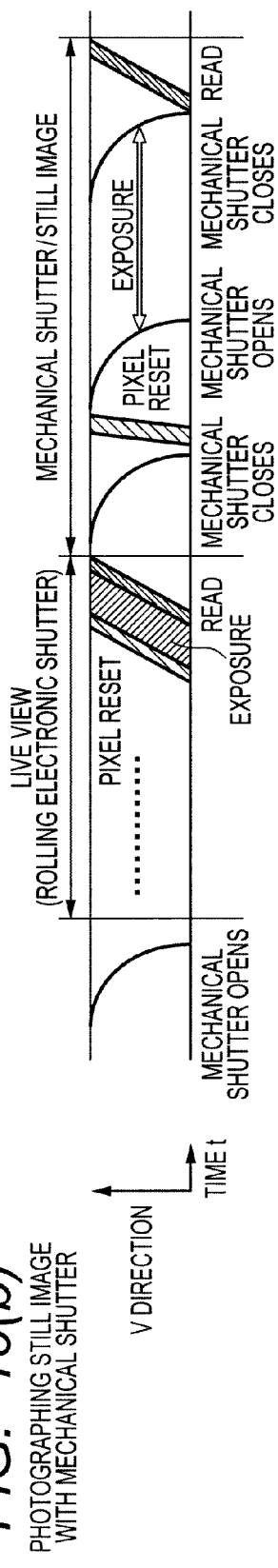
Figure 10C:
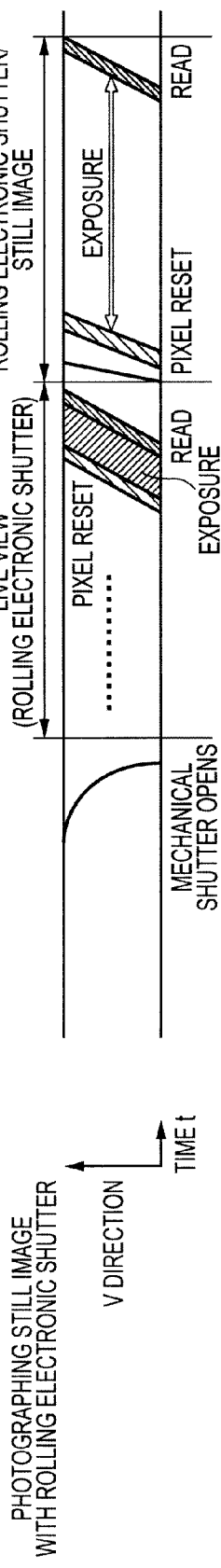

FIG. 10 (a), FIG. 10 (b), and FIG. 10 (c) are timing charts which illustrate a photographing method of a still image by a hybrid electronic shutter, an ordinary mechanical shutter, and a rolling electronic shutter, respectively. In the hybrid electronic shutter, since an exposure start is performed by an electronic shutter, a mechanical shutter is opened prior to the exposure start. In order to hold the exposure time of each row constant, the end of the pixel reset which is an exposure start by the electronic shutter is adjusted to the closing operation of the mechanical shutter. The hybrid electronic shutter can be employed when taking a photograph of a still image from a live view mode.

When taking a photograph by checking composition on a liquid crystal display of the back instead of through a finder, displaying operation on the liquid crystal display is called a live view. Generally, in the live view, taking a photograph of a dynamic image is repeated, with the aid of a rolling electronic shutter function. In the case of taking a photograph of a still image from a live view mode, as compared with the static image photographing by means of the ordinary mechanical shutter, the static image photographing by means of the hybrid electronic shutter can omit the open/close operation of a mechanical shutter. Accordingly, it is possible to take a photograph at high speed. As compared with the static image photographing by means of the rolling electronic shutter, in the static image photographing by means of the hybrid electronic shutter, a mechanical shutter is closed; therefore, it is possible to prevent the blooming due to continued exposure to light from occurring, and image quality improves. The blooming means that, when a strong light is irradiated to a certain photodiode 11, a charge overflows from the photodiode 11 and is supplied to other surrounding photodiodes 11.

Figure 11:
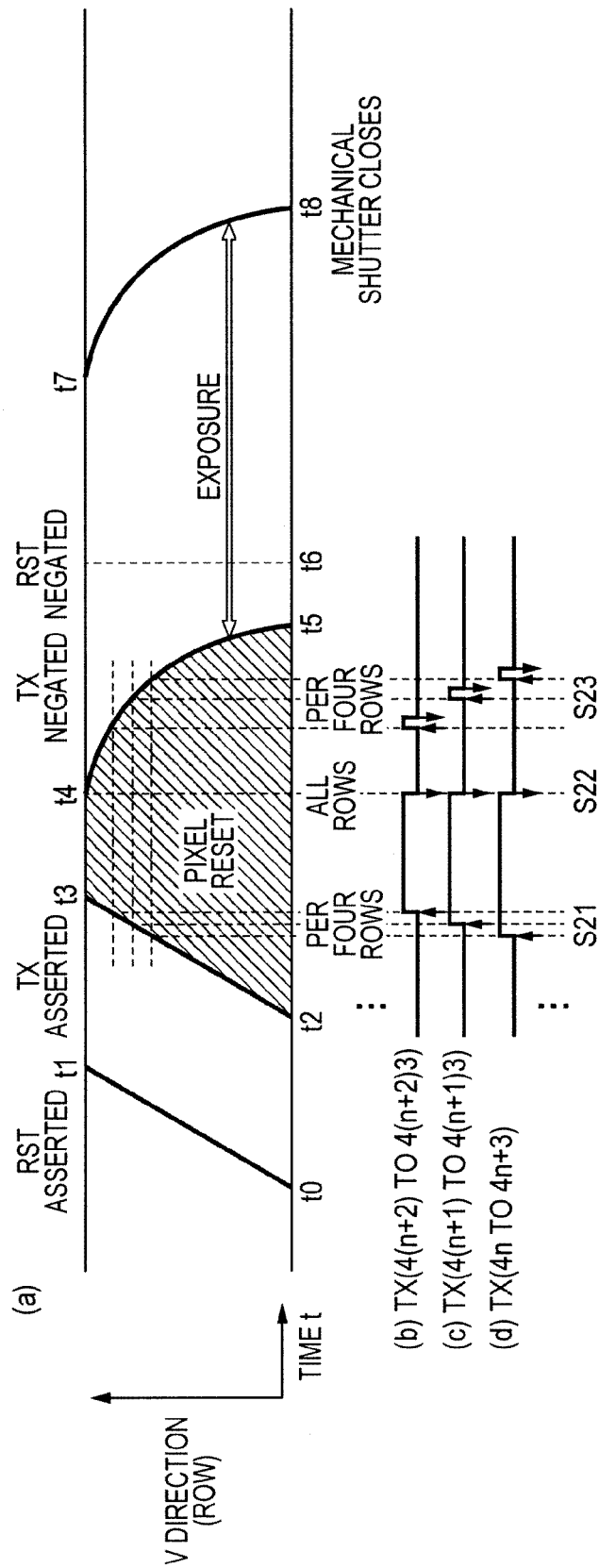
FIG. 11 is a timing chart illustrating hybrid electronic shutter operation in the image sensor illustrated in FIGS. 1-7.

FIG. 11 is a timing chart illustrating the hybrid electronic shutter system in the image sensor illustrated in FIGS. 1-7. In the case of performing the hybrid electronic shutter system, all of the signals AdA<3:0> that are obtained by predecoding the lower-order 2-bit address signal Ad1-Ad0 are maintained at an "H" level.

In (a)-(d) of FIG. 11, at time t0-t1, the row selection address signal AdN-Ad2 is incremented sequentially, and the latch circuit of all the RST decoder 32 is set sequentially. Accordingly, the reset signal RST of all the rows is activated to an "H" level (assertion). Activation (assertion) and deactivation (negation) of the transfer signal TX are performed in three Steps S21-S23.

At Step S21, the row selection address signal AdN-Ad2 is incremented by one (+1) sequentially, and the latch circuit of all the TX decoders 31 is set sequentially (time t2-t3). Accordingly, the transfer signal TX of all the rows is activated to an "H" level.

At Step S22, the all-latches reset signal TXADD_RESET_n is set to an "L" level, and the latch circuit of all the TX decoders 31 is reset. Accordingly, the transfer signal TX of all the rows is temporally deactivated to an "L" level.

At Step S23, the row selection address signal AdN-Ad2 is decremented by one (−1) sequentially in a predetermined cycle, and the all-latches reset signal TXADD_RESET_n is set to an "L" level in a predetermined cycle (time t4-t5). Accordingly, the transfer signal TX of all the rows is set to an "H" level for a prescribed time and the electronic shutter is driven to the same timing as the mechanical shutter.

At time t6, the all-latches reset signal RSTADD_RESET_n is set to an "L" level, and the reset signal RST of all the rows is deactivated to an "L" level. In time t7-t8, the mechanical shutter is closed and taking the photograph of a still image by means of the hybrid electronic shutter is completed.

As described above, in Embodiment 1, the voltage level shift function on the side of "H" level has been granted to the row selection decoder circuit 35. Therefore, compared with the case where the voltage level shift circuit on the side of "H" level is provided separately, it is possible to attain the reduction of the number of elements and the reduction of the circuit area.

Since one row selection decoder circuit 35 with a voltage level shift function is shared in plural rows (four rows in Embodiment 1), it is possible to attain the reduction of the circuit area. In particular, as for the TX decoder 31, in cases where the "L" level of the transfer signal TX is set to a negative voltage in order to make small the dark current which is related to the pixel performance, it is necessary to provide the level shifter 36 which performs a level shift from the ground voltage GND to the negative voltage. Since the level shifter 36 can also be shared in plural rows, it is possible to attain further reduction of the circuit area.

Since the latch circuit is provided in the row selection decoder circuit 35, a read row and a reset row can be easily selected by repeating the address-based set of the latch circuit in the read row and the reset row. Consequently, it becomes possible to make shared use of one row selection decoder circuit 35 in the read operation and the reset operation, leading to the reduction of the circuit area.

In Embodiment 1, the row selection decoder circuit 35 is shared in four rows. However, it is possible to share the row selection decoder circuit 35 in the rows of the desired number out of the K-th power of 2 (K is a positive integer). It is also possible to provide the row selection decoder circuit 35 in one row.

Embodiment 1 has been explained for the image sensor provided with the 4Tr-type pixel circuit 10 in which four transistors 12-15 are provided to one photodiode 11. However, in order to expand the aperture ratio of a pixel, a pixel with the structure of a pixel sharing type (a 2.5Tr-type pixel, 1.75Tr-type pixel) exists. The 2.5Tr-type pixel shares three transistors 13-15 except the transfer transistor 12 by two pixels, and the 1.75Tr-type pixel shares three transistors 13-15 by four pixels. The number of Tr indicates the number of transistors corresponding to one pixel. In the 2.5Tr-type pixel, the number of the reset signal RST and the selection signal SEL to the number of the transfer signal TX become a half that of the 4Tr-type pixel. In the 1.75Tr-type pixel, the number of the reset signal RST and the selection signal SEL to the number of the transfer signal TX becomes a quarter that of the 4Tr-type pixel.

In Embodiment 1, the row selection decoder circuit with a voltage level shift function is shared with respect to all kinds of signals TX, RST, and SEL. However, in the case of a 2.5Tr-type pixel or a 1.75Tr-type pixel, an address system can be simplified by sharing the row selection decoder circuit 35 with a voltage level shift function only with respect to the transfer signal TX. By sharing as many as lower-order 1 bit of an address in the case of a 2.5Tr-type pixel, and as many as lower-order 2 bits of an address in the case of a 1.75Tr-type pixel, the higher-order address of the sharing part can be treated in the same way as the reset signal RST and the selection signal SEL.

Figure 12:
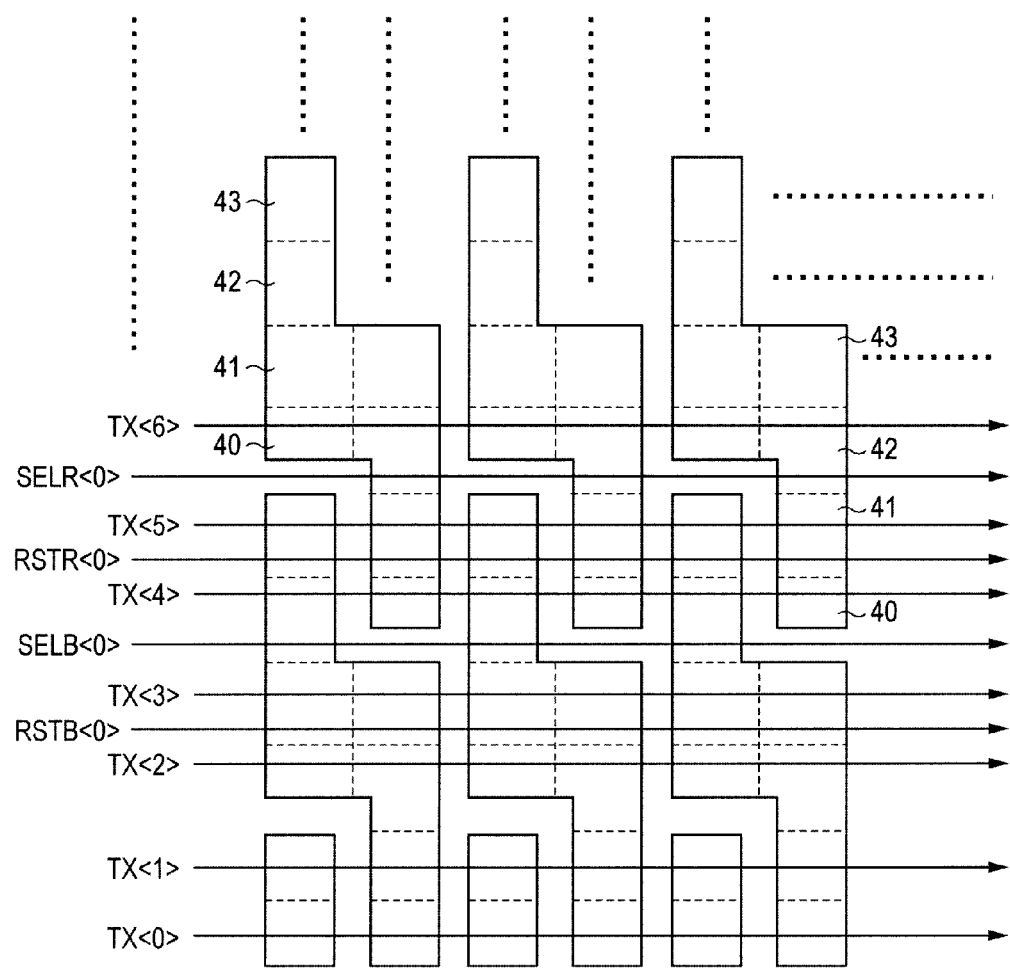
FIG. 12 is a drawing illustrating a modified example of Embodiment 1.

Next, the following shows an example which can simplify the circuit of the image sensor using a 1.75Tr-type pixel circuit, by providing a latch to the row selection decoder circuit 35. FIG. 12 illustrates a pixel array including plural groups of 1.75Tr-type pixel circuits 40-43. In the present pixel array illustrated in FIG. 12, a transistor is shared by four pixel circuits 40-43 of the same group. The pixel circuits 40-43 of each group are arranged on a line in the column direction.

In the present 1.75Tr-type pixel circuit, the pixel circuits 40-43 are moved by two pixels in the column direction, in an even number column and an odd number column, in order to stuff the elements efficiently. Therefore, it is necessary to employ the selection signal SEL and the reset signal RST which are different in the even number column and the odd number column. In the even number column, a selection signal SELR and a reset signal RSTR are employed, and in the odd number column, a selection signal SELB and a reset signal RSTB are employed. In FIG. 12, in the even number column, a selection signal SELR<0> and a reset signal RSTR<0> are employed, and in the odd number column, a selection signal SELB<0> and a reset signal RSTB<0> are employed.

When it is tried to handle such a case by a logic circuit without providing a latch circuit, a complicated circuit configuration like an OR circuit acting across a row is necessary. However, in Embodiment 1, the complicated circuit configuration is unnecessary because the latch circuit is provided.

FIG. 13 shows a table illustrating the correspondence relation of an address Ad and signals TX, SELR, RSTR, SELB, and RSTB in the pixel array illustrated in FIG. 12. As seen from FIG. 13, the number of the transfer signal TX increases whenever the address "Ad" is incremented, and the number of the selection signal SELB and the number of the reset signal RSTB increase by 1 whenever the address "Ad" increases by 4, starting from 0. On the other hand, the number of the selection signal SELR and the number of the reset signal RSTR increase by 1 whenever the address "Ad" increases by 4, starting from 2. Therefore, what is necessary is just to decode the address "Ad" to select the signals TX, SELB, and RSTB, and to decode the address "Ad-2" to select the signals SELR and RSTR.

Figure 14:
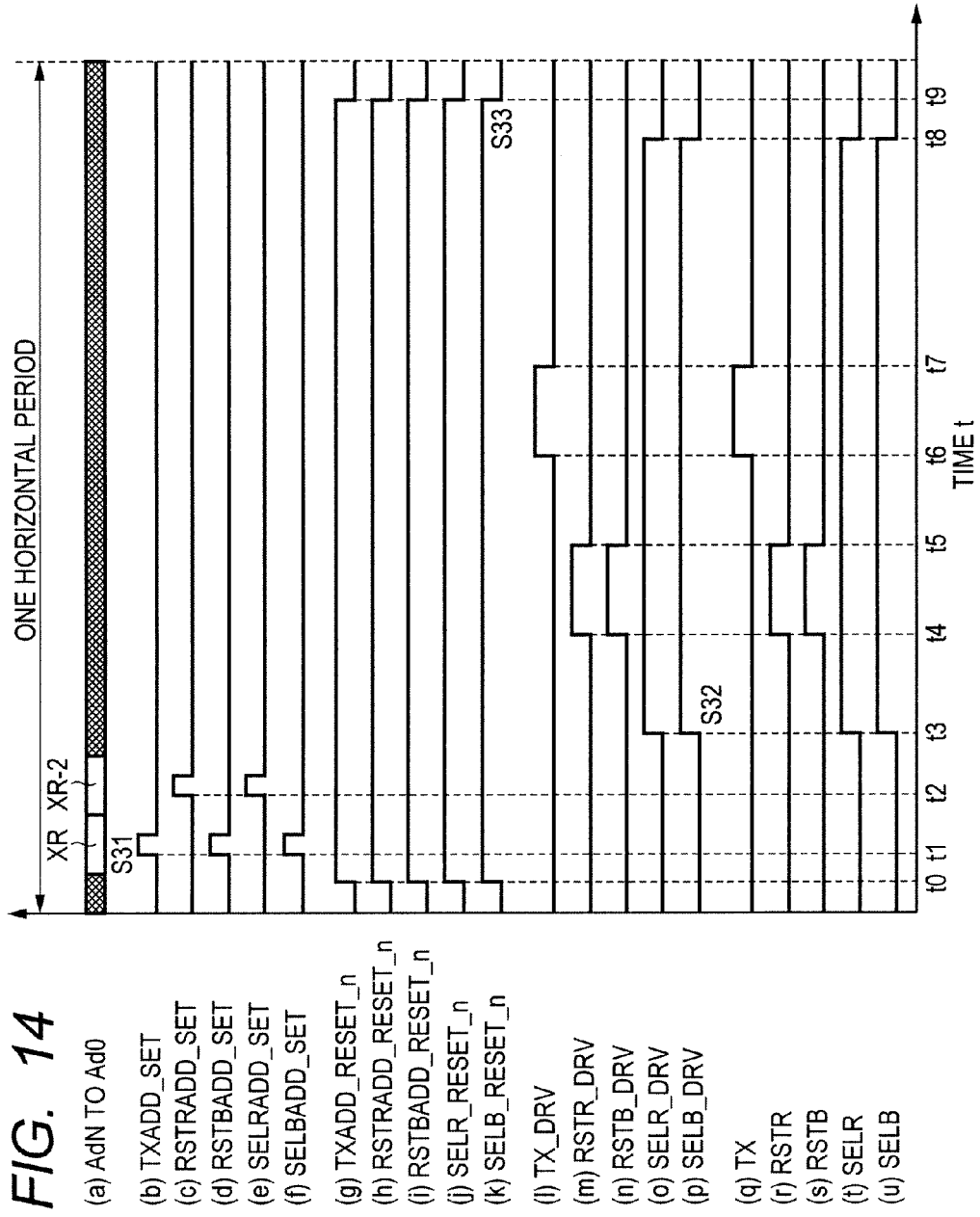
FIG. 14 is a timing chart illustrating read operation of the image sensor illustrated in FIGS. 12 and 13.

FIG. 14 is a timing chart illustrating read operation of the image sensor illustrated in FIGS. 12 and 13. In (a)-(u) of FIG. 14, the read operation in one horizontal period is divided into three Steps S31-S33.

At Step S31, the latch circuit of a row corresponding to the read address XR is set. That is, as illustrated in (a)-(d) of FIG. 14, the row selection address signal AdN-Ad0 which indicates the read address XR is supplied, the set signals TXADD_SET, RSTBADD_SET, and SELBADD_SET are set to an "H" level for a prescribed time, and the latch circuit of a row corresponding to the read address XR is set (time t1).

The row selection address signal AdN-Ad0 which indicates the read address XR-2 is supplied, the set signals RSTRADD SET and SELRADD SET are set to an "H" level for a prescribed time, and the latch circuit of a row corresponding to the read address XR-2 is set (time t2).

At Step S32, signals corresponding to the read are formed. That is, as illustrated in (l)-(p) of FIG. 14, the forming signals for the read TX_DRV, RSTR_DRV, RSTB_DRV, SELR_DRV, and SELB_DRV are generated, and the transfer signal TX<XR>, the reset signals RSTR<XR> and RSTB<XR>, the selection signals SELR<XR> and SELB<XR> are outputted. The selection signals SELR<XR> and SELB<XR> are set to an "H" level at time t3-t8. The reset signals RSTR<XR> and RSTB<XR> are set to an "H" level at time t4-t5. The transfer signal TX<XR> is set to an "H" level at time t6-t7.

For example, in an even number column, when the selection signal SELR<XR> is set to an "H" level (time t3), the select transistor 15 of the pixel circuits 40-43 becomes conductive. When the reset signal RSTR<XR> is set to an "H" level (time t4), the reset transistor 13 of the pixel circuits 40-43 becomes conductive, and the node N12 is reset to the power supply voltage VCC. When the reset signal RSTR<XR> is set to an "L" level (time t5), the reset transistor 13 becomes non-conductive. Then, a dark current flows from the line of the power supply voltage VCC to the vertical signal line LV via the transistors 14 and 15, and the dark signal is read.

When the transfer signal TX<XR> is set to an "H" level (time t6), the transfer transistor 12 of the selected pixel circuit (for example, 40) becomes conductive and a voltage corresponding to a charge generated in the photodiode 11 appears at the node N12. When the transfer signal TX<XR> is set to an "L" level (time t7), the transfer transistor 12 becomes non-conductive, then the photoelectric current of a value corresponding to the voltage of the node N12 flows from the line of power supply voltage VCC to the vertical signal line LV via the transistors 14 and 15, and a light signal is read. When the selection signal SELR<XR> is set to an "L" level (time t8), the select transistor 15 becomes non-conductive.

At Step S33, the latch circuit of each signal is reset. That is, as illustrated in (g)-(k) of FIG. 14, the reset signals TXADD_RESET_n, RSTRADD_RESET_n, RSTBADD_RESET_n, SELRADD_RESET_n, and SELBADD_RESET_n are set to an "L" level, and all the latch circuits are reset (time t9). In this way, owing to the latch circuit provided to the row selection decoder circuit, it is possible to perform easily the read operation in the image sensor using a 1.75Tr-type pixel circuit, only by performing the address-based latch set one more time.

Embodiment 2

Figure 15:
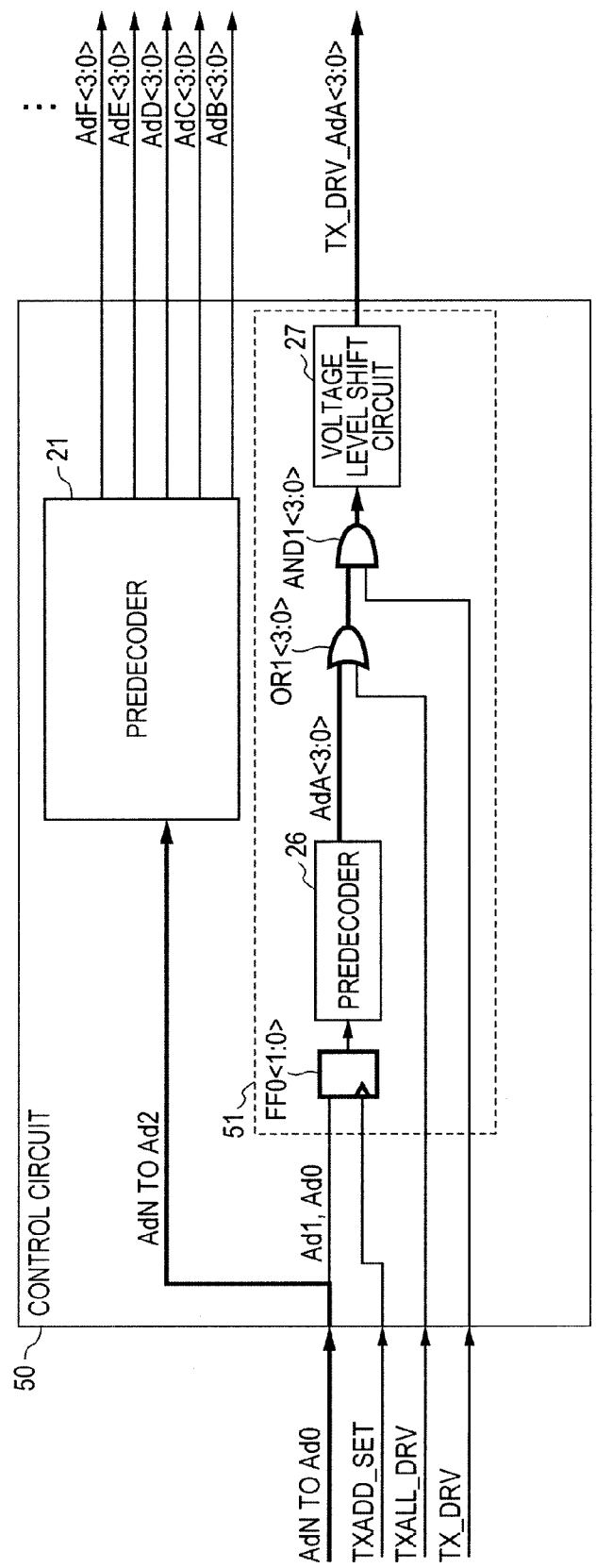
FIG. 15 is a circuit block diagram illustrating a configuration of a control circuit of an image sensor according to Embodiment 2 of the present invention.

FIG. 15 is a circuit block diagram illustrating a configuration of a control circuit 50 of an image sensor according to Embodiment 2 of the present invention, in comparison with FIG. 5. In FIG. 15, the control circuit 50 differs from the control circuit 20 in a point that the voltage level shift circuit 23 is removed and the forming signal generating circuit 22 is replaced by a forming signal generating circuit 51. The forming signal generating circuit 51 is equivalent to the forming signal generating circuit 22 added with a logical addition circuit OR1<3:0>.

The logical addition circuit OR1<3:0> generates logical addition signals of output signals AdA<3:0> of the predecoder 26 and the forming signal TXALL_DRV, and supplies the four logical addition signals generated to the logical product circuit AND1<3:0>. When the forming signal TXALL_DRV is set to an "H" level, the four output signals of the logical addition circuit OR1<3:0> are all set to an "H" level, and the forming signals TX_DRV_AdA<3:0> are all set to an "H" level.

Figure 16:
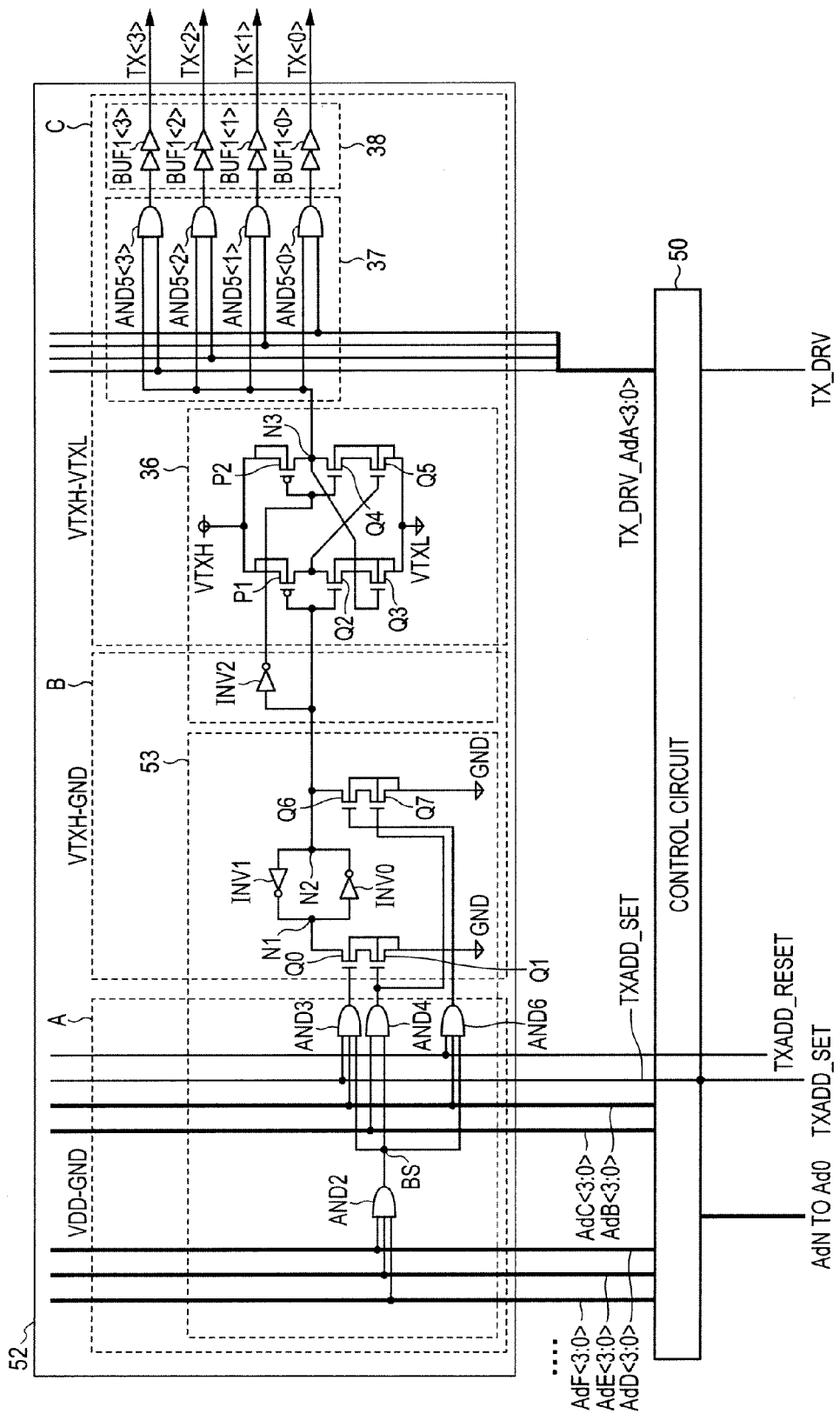
FIG. 16 is a circuit diagram illustrating a configuration of a TX decoder of the image sensor explained in FIG. 15.

FIG. 16 is a circuit block diagram illustrating a configuration of the control circuit 50 and a TX decoder 52 of the image sensor, in comparison with FIG. 6. In FIG. 16, the TX decoder 52 differs from the TX decoder 31 in a point that the row selection decoder circuit 35 is replaced by a row selection decoder circuit 53. The row selection decoder circuit 53 is equivalent to the row selection decoder circuit 35 of which the P-channel MOS transistor P0 is replaced with a logical product circuit AND6 and N-channel MOS transistors Q6, and Q7.

The N-channel MOS transistors Q6 and Q7 are coupled in series between the node N2 and the line of the ground voltage GND. The logical product circuit AND6 generates a logical product signal of a block selection signal BS, a predecode signal (for example, AdA3) assigned in advance to a row group corresponding to the predecode signals AdB<3:0>, and an address-based latch reset signal TXADD_RESET. The logical product circuit AND6 supplies the logical product signal generated to a gate of the transistor Q6. A gate of the transistor Q7 receives an output signal of the logical product circuit AND4.

When the corresponding row group is selected by the row selection address signal AdN-Ad0 and the address-based latch reset signal TXADD_RESET is set to an "H" level, the N-channel MOS transistors Q6 and Q7 become conductive, the node N2 is set to an "L" level, and the latch circuit including the inverters INV0 and INV1 is reset.

The RST decoder and the SEL decoder are also the same as the TX decoder 52 in configuration. However, in each of the RST decoder and the SEL decoder, the negative voltage is unnecessary and the level shifter 36 is not provided. The forming circuit 37 and the output buffer 38 are driven by the power supply voltage VTXH and the ground voltage GND.

Figure 17:
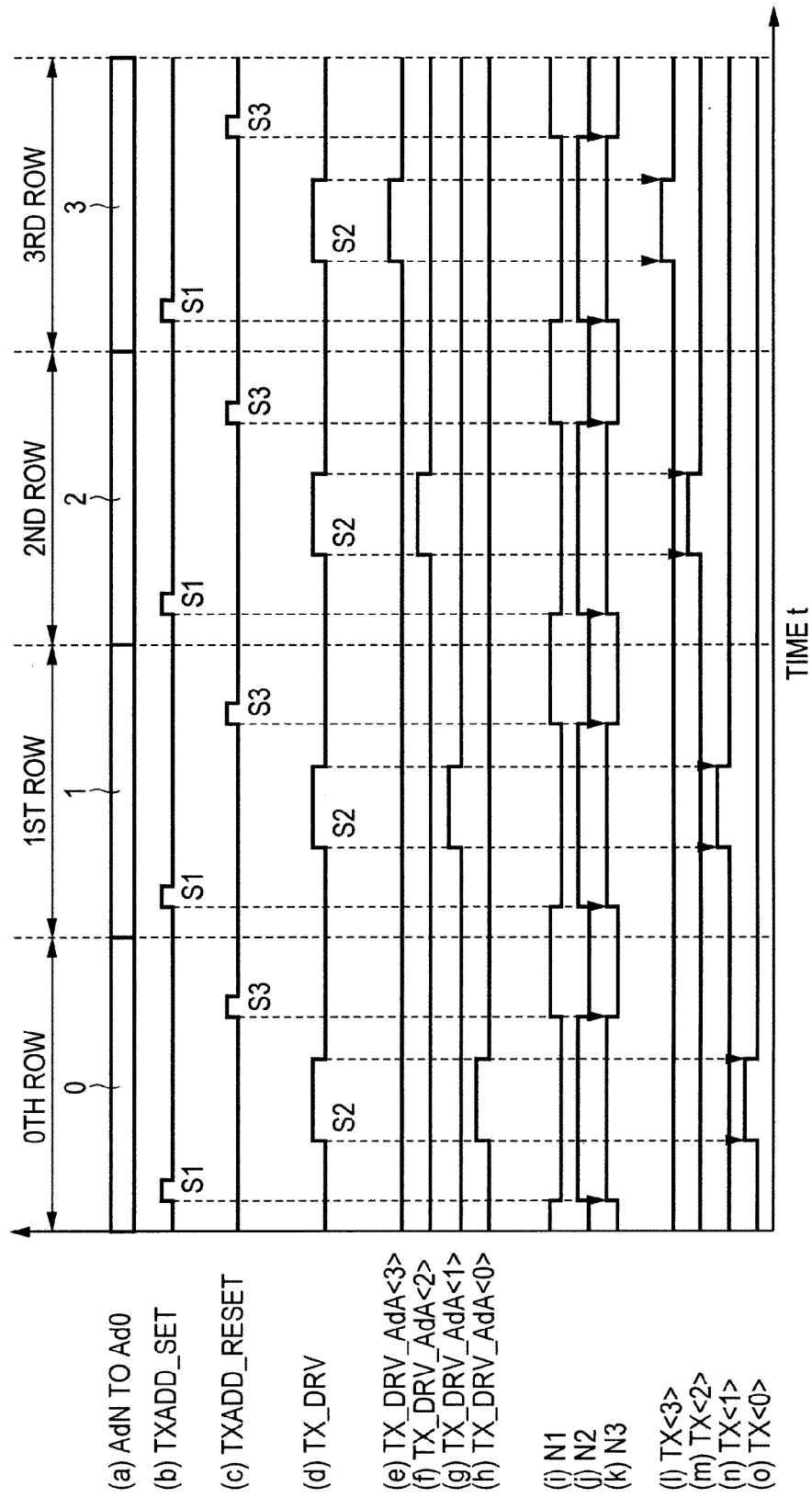
FIG. 17 is a timing chart illustrating read operation of the control circuit and the TX decoder illustrated in FIG. 15 and FIG. 16, respectively.

FIG. 17 is a timing chart illustrating the transfer signals TX<3:0> in read operation, in comparison with FIG. 7. At Step S3 of (a)-(o) of FIG. 7, the all-latches reset signal TXADD_RESET_n is enabled to reset the latch circuit of the selected row group. On the other hand, at Step S3 of (a)-(o) of FIG. 17, the address-based latch reset signal TXADD_RESET is enabled to reset the latch circuit of the selected row group. Therefore, in Embodiment 2, the latch circuit is resettable in units of row groups.

Figure 18:
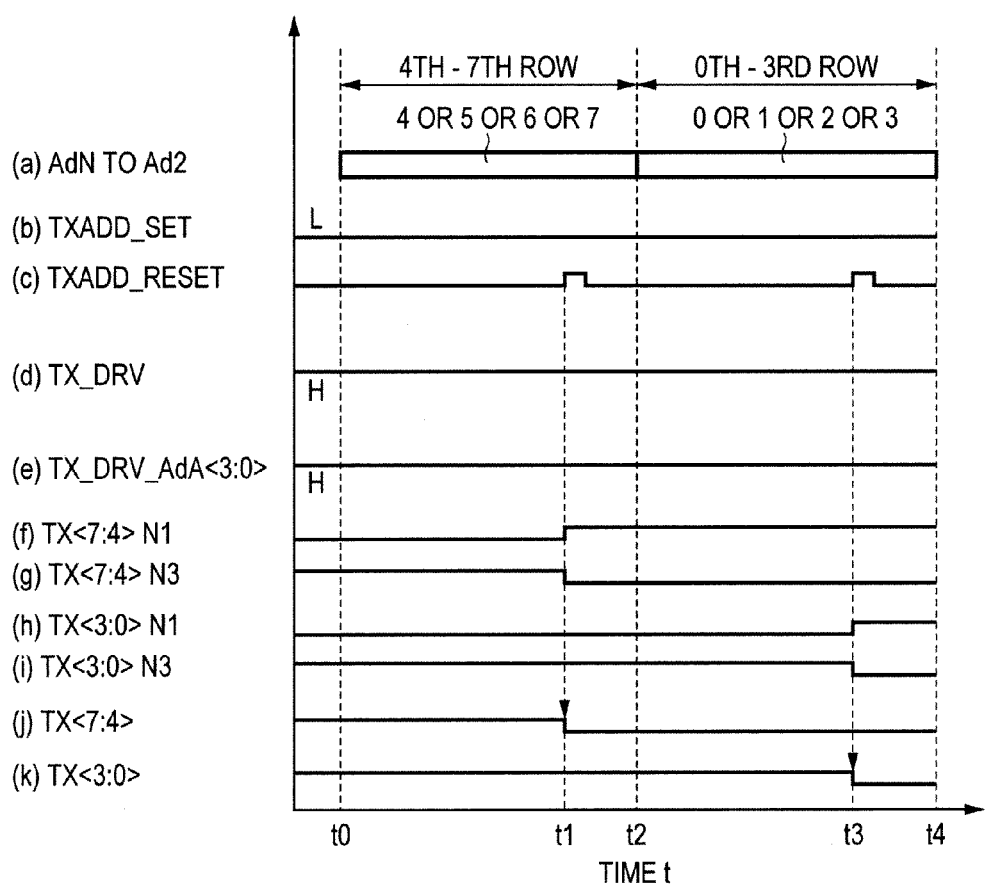
FIG. 18 is a timing chart illustrating a transfer signal at the end of picture element reset of a hybrid electronic shutter.

FIG. 18 is a timing chart illustrating a transfer signal TX at the end of picture element reset of a hybrid electronic shutter. In Embodiment 2, the address-based set function (transistors Q0 and Q1) and the address-based reset function (transistors Q6 and Q7) of the latch have been provided in the row selection decoder circuit 53. Therefore, from the state in which the latch circuits of all the row groups have been set, all the latch circuits can be reset sequentially, one by one.

The latch circuit is held in a set state, and the forming signal TX_DRV and the signal TXALL_DRV are fixed to an "H" level. Accordingly, the address forming signals TX_DRV_AdA<3:0> are all fixed to an "H" level, and the level of the transfer signal TX is decided by the state (set or reset) of the latch circuit.

By enabling the address-based latch reset signal TXADD_RESET and by decrementing by one (−1) sequentially the address signal AdN-Ad2 except the lower-order 2 bits, the level of the transfer signal TX is changed from an "H" level to an "L" level every four signals in order.

In (a)-(k) of FIG. 18, at the end of picture element reset of the hybrid electronic shutter, the address-based latch set signal TXADD_SET is fixed to an "L" level, and setting the latch circuit is forbidden. The forming signal TX_DRV and the signal TXALL_DRV are fixed to an "H" level, and the address forming signals TX_DRV_AdA<3:0> are all fixed to an "H" level.

In (a)-(k) of FIG. 18, the state is illustrated in which the transfer signals TX<7:4> and TX<3:0> are at an "H" level at time to. At time t0-t2, the row selection address signal AdN-Ad2 indicating the fourth row to the seventh row is supplied, and at time t1, the address-based latch reset signal TXADD_RESET is set to an "H" level for a prescribed time. Accordingly, the transistors Q6 and Q7 of the row selection decoder circuit 53 corresponding to the fourth row to the seventh row become conductive, the latch circuit is reset, the nodes N1 and N3 are set to an "H" level and an "L" level, respectively, and the transfer signals TX<7:4> are set to an "L" level.

At time t2-t4, the row selection address signal AdN-Ad2 indicating the zeroth row to the third rows are supplied, and the address-based latch reset signal TXADD_RESET is set to an "H" level for a prescribed time at time t3. Accordingly, the transistor Q6 and Q7 of the row selection decoder circuit 53 corresponding to the zeroth row to the third row become conductive, the latch circuit is reset, the node N1 and N3 are set to an "H" level and an "L" level, respectively, and the transfer signals TX<3:0> are set to "L" level.

Figure 19:
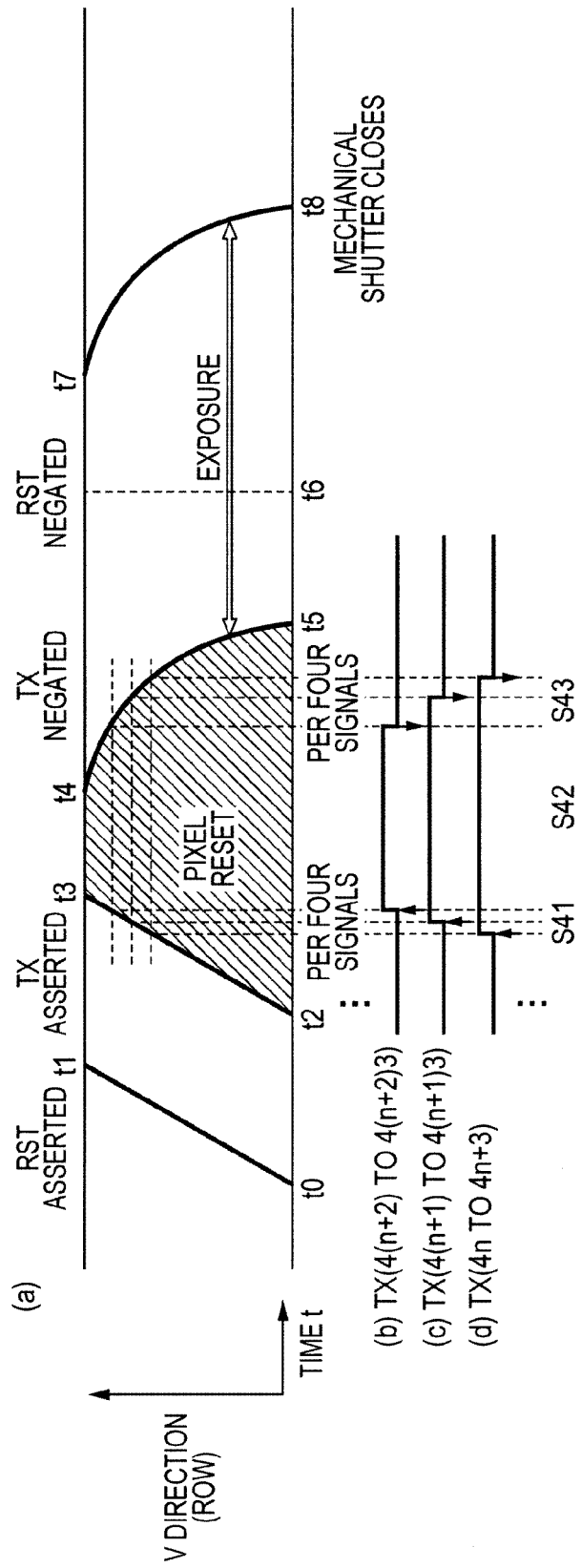
FIG. 19 is a timing chart illustrating hybrid electronic shutter operation in the image sensor illustrated in FIGS. 15-18.

FIG. 19 is a timing chart illustrating the hybrid electronic shutter system employed in the image sensor of Embodiment 2, in comparison with FIG. 11. In (a)-(d) of FIG. 19, at time t0-t1, the row selection address signal AdN-Ad2 is incremented sequentially, and the latch circuit of all the RST decoder 32 is set sequentially. Accordingly, the reset signal RST of all the rows is activated to an "H" level (assertion). Activation (assertion) and deactivation (negation) of the transfer signal TX are performed in three Steps S41-S43.

At Step S41, the row selection address signal AdN-Ad2 is incremented by one (+1) sequentially, and the latch circuit of all the TX decoders 52 is set sequentially (time t2-t3). Accordingly, the transfer signal TX of all the rows is activated to an "H" level. At Step S42, all the latch circuits are maintained in a set state.

At Step S43, the row selection address signal AdN-Ad2 is decremented by one (−1) sequentially in a predetermined cycle, and the address-based latch reset signal TXADD_RESET is set to an "H" level for a prescribed time in a predetermined cycle (time t4-t5). Accordingly, the transfer signal TX for every four rows is set to an "L" level, and the electronic shutter is driven to the same timing as the mechanical shutter.

At time t6, the reset signal RST of all the rows is deactivated to an "L" level. In time t7-t8, the mechanical shutter is closed and taking the photograph of a still image by means of the hybrid electronic shutter is completed.

As described above, the same effect as in Embodiment 1 is obtained in Embodiment 2. Unlike Embodiment 1, the simultaneous negation operation of all the rows (signals) is not performed in Embodiment 2. That is, since the set function and the reset function of the latch circuit have been provided in each row selection decoder circuit 53, it is not necessary to perform simultaneous operation of all the rows in the hybrid electronic shutter system. Therefore, the operating current decreases more than that in Embodiment 1, and the amount of IR drop of the power supply voltage and the ground voltage GND also becomes small; accordingly, the deficiency due to the increase in the amount of IR drop does not occur.

When carrying out the hybrid electronic shutter system, the set/reset operation of each latch circuit is performed only once. Therefore, as compared with Embodiment 1, it is possible to attain simplification of control, reduction of area of the control circuit, and reduction of operating current.

Embodiment 3

Figure 20:
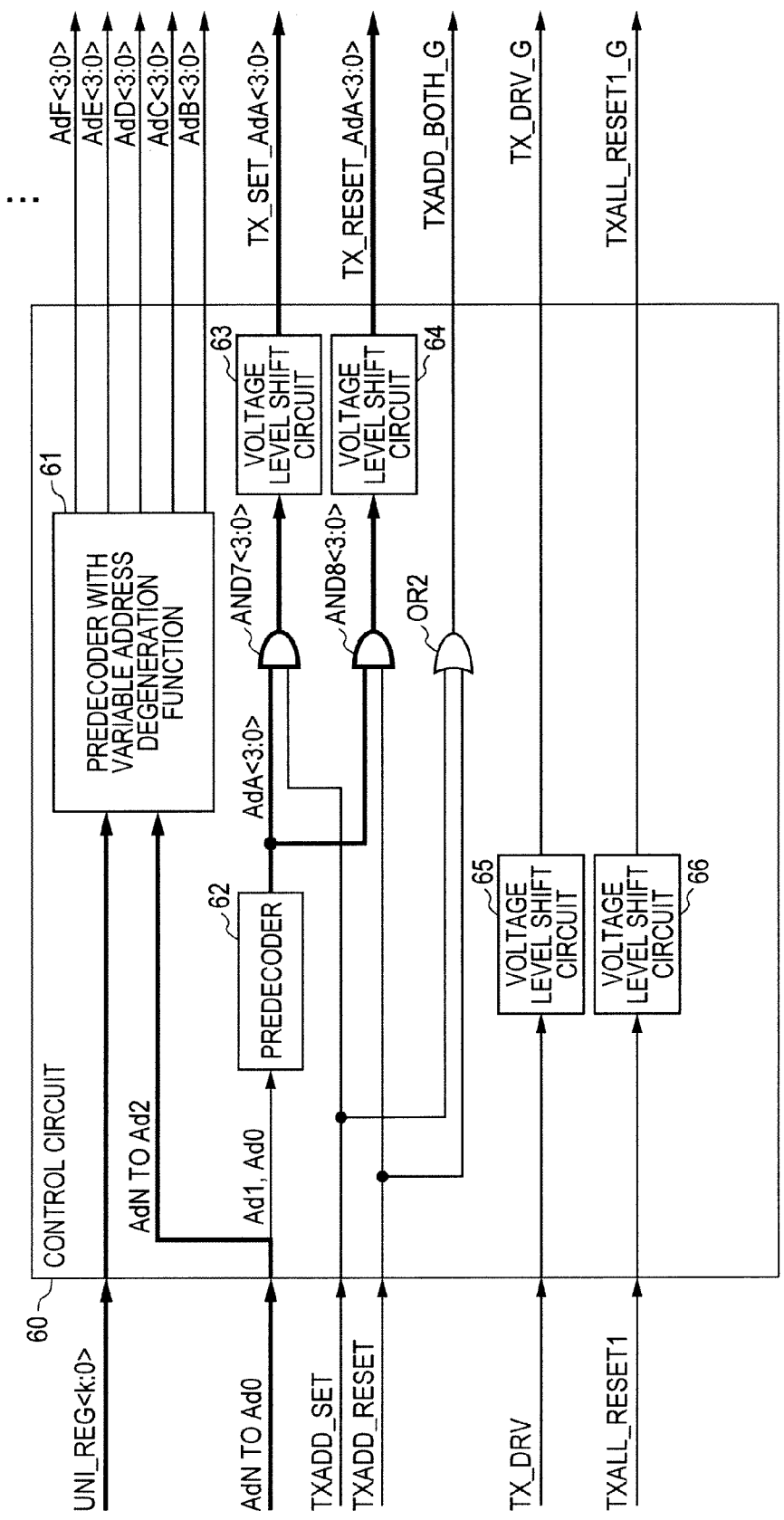
FIG. 20 is a circuit block diagram illustrating a configuration of a control circuit of an image sensor according to Embodiment 3 of the present invention.

FIG. 20 is a circuit block diagram illustrating a configuration of a control circuit 60 of an image sensor according to Embodiment 3 of the present invention, in comparison with FIG. 5. In FIG. 20, the control circuit 60 includes a predecoder 61 with a variable address degeneration function, a predecoder 62, logical product circuits AND7<3:0> and AND8<3:0>, a logical addition circuit OR2, and voltage level shift circuits 63-66.

The predecoder 61 generates predecode signals AdB<3:0>, AdC<3:0>, AdD<3:0>, - - - , by predecoding, for every 2 bits, the higher-order address signal AdN-Ad2 excluding the lower-order 2-bit signal Ad1-Ad0 of the row selection address signal AdN-Ad0. The variable address degeneration function will be described later.

The predecoder 62 generates four predecode signals AdA<3:0> by predecoding the lower-order 2-bit signal Ad1-Ad0 of the address signal. The logical product circuit AND7<3:0> generates logical product signals of the predecode signals AdA<3:0> and the set signal TXADD_SET, respectively. The voltage level shift circuit 63 generates four set signals TX_SET_AdA<3:0> by performing voltage conversion of the output signal of the logical product circuit AND7<3:0>. Since only one signal of the predecode signals AdA<3:0> is set to an "H" level, only one signal of the four set signals TX_SET_AdA<3:0> is driven.

The logical product circuit AND8<3:0> generates logical product signals of the predecode signals AdA<3:0> and the reset signal TXADD_RESET, respectively. The voltage level shift circuit 64 generates four reset signals TX_RESET_AdA<3:0> by performing voltage conversion of the output signal of the logical product circuit AND8<3:0>.

Since only one signal of the predecode signals AdA<3:0> is set to an "H" level, only one signal of the four reset signals TX_RESET_AdA<3:0> is driven. The logical addition circuit OR2 outputs a logical addition signal TXADD_BOTH_G of the set signal TXADD_SET and the reset signal TXADD_RESET.

The "H" level and the "L" level of each of the row selection address signal AdN-Ad0, the set signal TXADD_SET, the reset signal TXADD_RESET, the forming signal TX_DRV, and the reset signal TXALL_RESET1, supplied by the timing generator 4, are the power supply voltage VDD and the ground voltage GND, respectively.

The voltage level shift circuit 63 generates four set signals TX_SET_AdA<3:0>, by converting the "H" level of the output signal of the logical product circuit AND7<3:0> from the power supply voltage VDD to the power supply voltage VTXH, and the "L" level of the output signal of the logical product circuit AND7<3:0> from the ground voltage GND to the negative voltage VTXL.

The voltage level shift circuit 64 generates four reset signals TX_RESET_AdA<3:0>, by converting the "H" level of the output signal of the logical product circuit AND8<3:0> from the power supply voltage VDD to the power supply voltage VTXH, and the "L" level of the output signal of the logical product circuit AND8<3:0> from the ground voltage GND to the negative voltage VTXL.

The voltage level shift circuit 65 generates a forming signal TX_DRV_G, by converting the "H" level of the forming signal TX_DRV from the power supply voltage VDD to the power supply voltage VTXH, and the "L" level of the forming signal TX_DRV from the ground voltage GND to the negative voltage VTXL. The voltage level shift circuit 66 generates a reset signal TXALL_RESET1_G, by converting the "H" level of the reset signal TXALL_RESET1 from the power supply voltage VDD to the power supply voltage VTXH.

Figure 21:
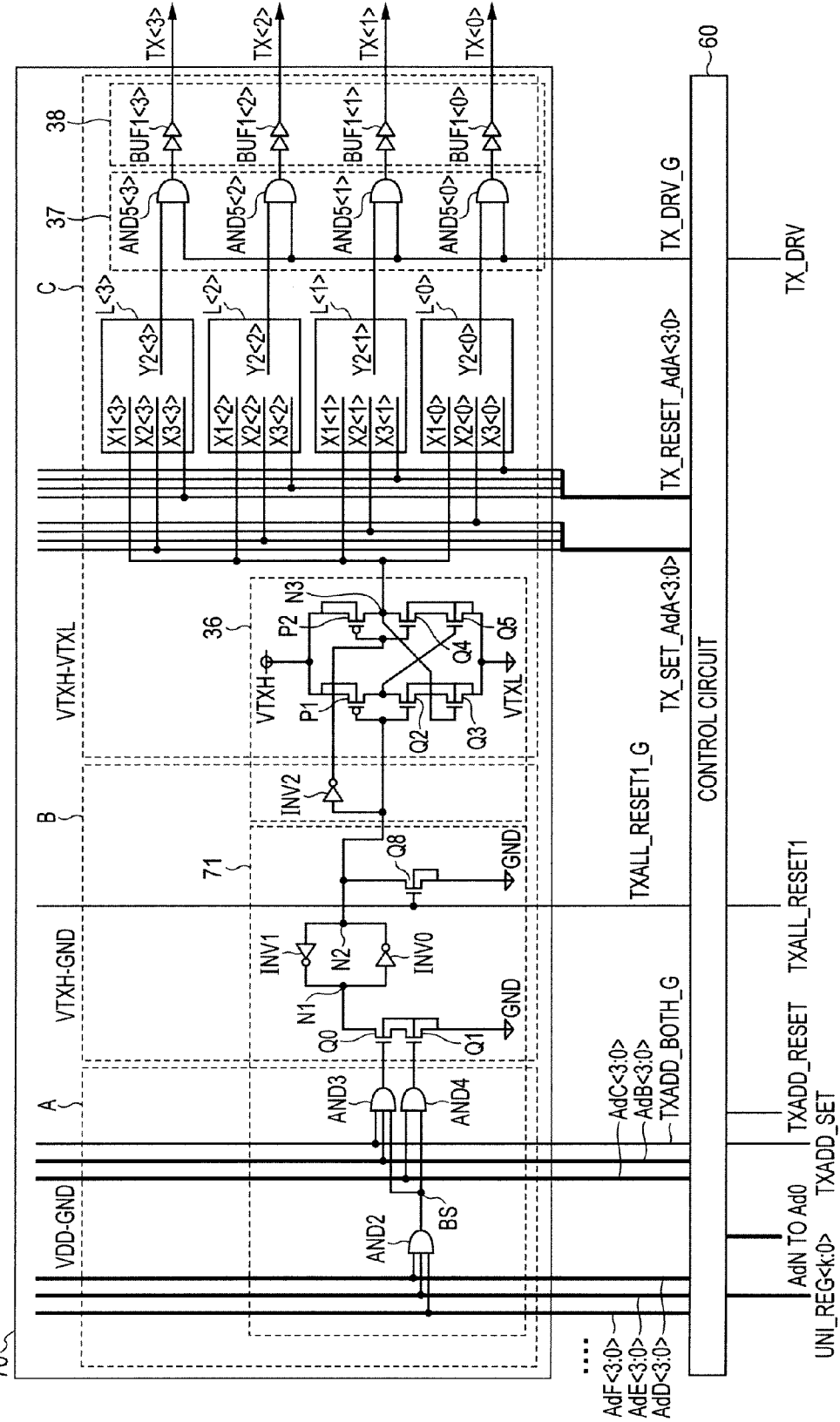
FIG. 21 is a circuit diagram illustrating a configuration of a TX decoder of the image sensor explained in FIG. 20.

FIG. 21 is a circuit block diagram illustrating a configuration of the control circuit 60 and a TX decoder 70 of the present image sensor, in comparison with FIG. 6. In FIG. 21, the TX decoder 70 differs from the TX decoder 31 in a point that the row selection decoder circuit 35 is replaced by the row selection decoder circuit 71, and an individual latch circuit L<3:1> is added.

The row selection decoder circuit 71 is equivalent to the row selection decoder circuit 35 of which the P-channel MOS transistor P0 is replaced by an N-channel MOS transistor Q8. The N-channel MOS transistor Q8 is coupled between the node N2 and the line of the ground voltage GND, and a gate thereof receives the reset signal TXALL_RESET1_G. When the reset signal TXALL_RESET1_G is set to an "H" level, the transistor Q8 of all the row selection decoder circuits 71 becomes conductive, the node N2 is set to an "L" level, and the latch circuit of all the row selection decoder circuits 71 is reset.

The set signal TXADD_BOTH_G is supplied to the logical product circuit AND3 instead of the set signal TXADD_SET. Accordingly, when the corresponding row group is selected by the row selection address signal AdN-Ad0 and the set signal TXADD_BOTH_G is set to an "H" level, the N-channel MOS transistors Q0 and Q1 become conductive, the node N1 is set to an "L" level, and the latch circuit including the inverters INV0 and INV1 is set.

The output node N3 of the level shifter 36 is coupled to a first input node X1<3:0> of the individual latch circuit L<3:0>. The set signals TX_SET_AdA<3:0> are inputted into a second input node X2<3:0> of the individual latch circuit L<3:0>, respectively. The reset signals TX_RESET_AdA<3:

0> are inputted into a third input node X3<3:0> of the individual latch circuit L<3:0>, respectively.

An output node Y2<3:0> of the individual latch circuit L<3:0> is coupled to one input node of the logical product circuit AND5<3:0>, respectively. The other input node of the logical product circuit AND<3:0> receives the forming signal TX_DRV_G.

Figure 22:
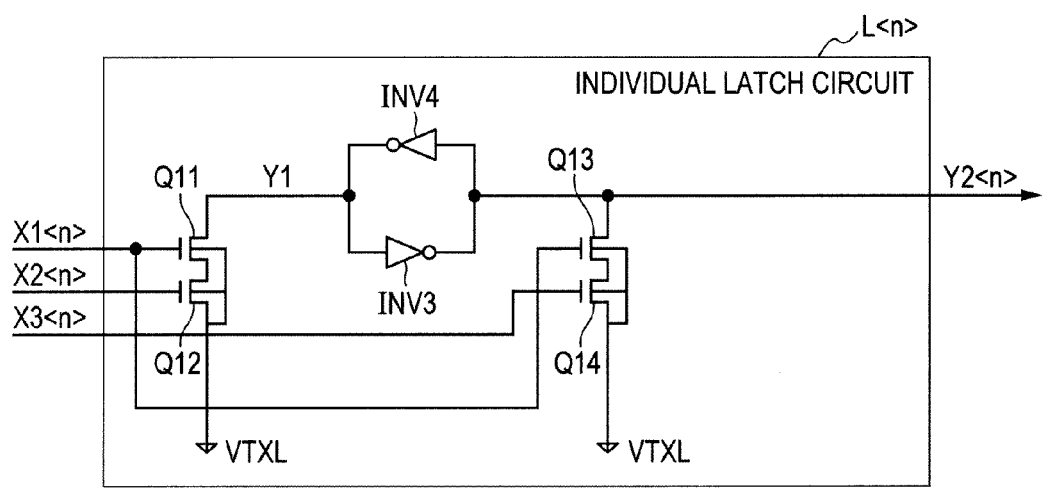
FIG. 22 is a circuit diagram illustrating a configuration of an individual latch circuit illustrated in FIG. 21.

The individual latch circuit L<n> (n=0, 1, 2, and 3) includes inverters INV3 and INV4, and N-channel MOS transistors Q11-Q14, as illustrated in FIG. 22. The inverter INV3 is coupled between the node Y1 and the node Y2<n>, and outputs to the node Y2<n> an inverted signal of the signal appearing at the node Y1. The inverter INV4 is coupled between the node Y2<n> and the node Y1, and outputs to the node Y1 an inverted signal of the signal appearing at the node Y2<n>. The inverters INV3 and INV4 are driven by the power supply voltage VTXH and the negative voltage VTXL.

The N-channel MOS transistors Q11 and Q12 are coupled between the node Y1 and the line of the negative voltage VTXL, and gates thereof are coupled to the input nodes X1<n> and X2<n>, respectively. The N-channel MOS transistors Q13 and Q14 are coupled between the node Y2<n> and the line of the negative voltage VTXL, and gates thereof are coupled to the input nodes X1<n> and X3<n>, respectively.

When the latch circuit of the row selection decoder circuit 71 is set and when the node N1 is set to an "L" level and the node N3 is set to an "H" level, the gates of the transistors Q11 and Q13 of the individual latch circuit L<n> are set to an "H" level. Accordingly, it becomes possible to perform the set and reset of the individual latch circuit L<n>.

When the set signal TX_SET_AdA<n> is set to an "H" level, the transistors Q11 and Q12 become conductive, the node Y1 is set to an "L" level, the individual latch circuit L<n> is set, and the node Y2<n> is set to an "H" level. Accordingly, it becomes possible to drive the transfer signal TX<n>.

When the reset signal TX_RESET_AdA<n> is set to an "H" level, the transistors Q13 and Q14 become conductive, the node Y2<n> is set to an "L" level, and the individual latch circuit L<n> is reset. In this case, the transfer signal TX<n> is fixed to an "L" level.

When the latch circuit of the row selection decoder circuit 71 is reset, the node N2 is set to an "L" level, and the node N3 is set to an "L" level, then the gates of the transistors Q11 and Q13 of the individual latch circuit L<n> are set to an "L" level, and the transistors Q11 and Q13 are fixed to a non-conductive state. Accordingly, the set state or the reset state of the individual latch circuit L<n> is maintained.

The RST decoder and the SEL decoder are also the same as RST decoder and the SEL decoder, the negative voltage is unnecessary and the level shifter 36 is not provided. The forming circuit 37 and the output buffer 38 are driven by the power supply voltage VTXH and the ground voltage GND.

Figure 23:
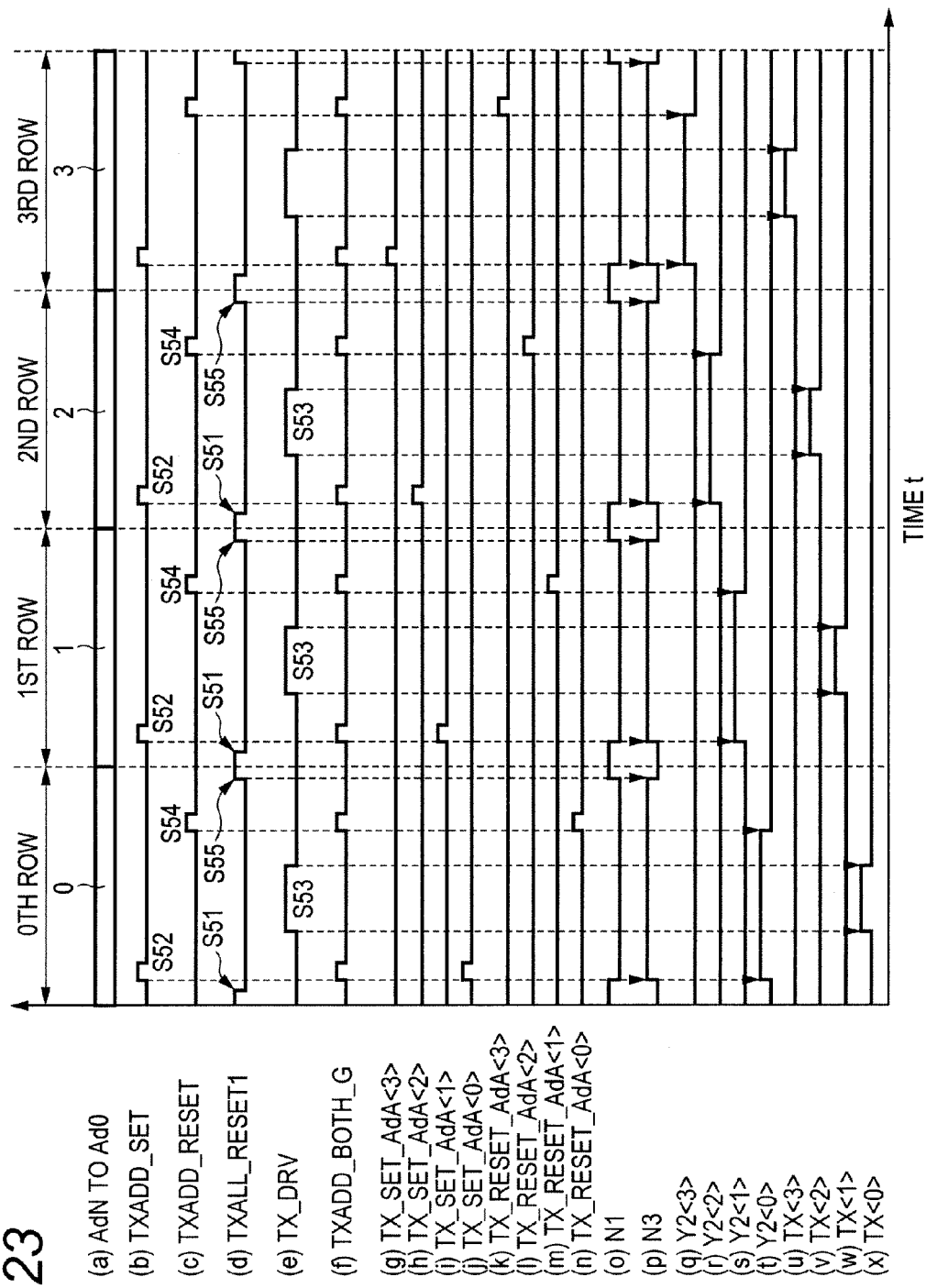
FIG. 23 is a timing chart illustrating read operation of the control circuit and the TX decoder illustrated in FIGS. 20-22.

FIG. 23 is a timing chart illustrating transfer signals TX<3:0> in read operation. In (a)-(x) of FIG. 23, the read operation includes Step S51 at which reset of the shared latch circuit (the latch circuit of the row selection decoder circuit 71) is canceled, Step S52 at which the shared latch circuit and the individual latch circuit L<n> are set, Step S53 at which the signal TX is formed, Step S54 at which the individual latch circuit L<n> is reset, and Step S55 at which the shared latch circuit is reset.

At Step S51, the reset signal TXALL_RESET1 is set to an "L" level, and the transistor Q8 of all the row selection decoder circuits 71 is set to be non-conductive. Accordingly, reset of the shared latch circuit is canceled.

At Step S52, the address-based latch set signal TXADD_SET is enabled, and the shared latch circuit of a row selected by the address signal AdN-Ad2 except the lower-order 2 bits and the individual latch circuit L<n> are set. When the individual latch circuit L<n> is set, one input node of the logical product circuit AND5<n> of the forming circuit 37 is set to an "H" level.

At Step S53, one signal of the transfer signals selected by the address (TX<n> in read of the n-th row) is driven, by asserting and negating the forming signal TX_DRV.

At Step S54, the reset signal TXADD_RESET is enabled and the individual latch circuit L<n> of the selected row is reset. When the individual latch circuit L<n> is reset, one input node of the logical product circuit AND5<n> of the forming circuit 37 is set to an "L" level.

At Step S55, the reset signal TXALL_RESET1 is set to an "H" level, and the transistor Q8 of all the row selection decoder circuits 71 is set to be conductive. Accordingly, the shared latch circuit is reset, in preparation for operation of the next row. Five Steps S51-S55 described above are repeated for every row by incrementing the row selection address signal AdN-Ad0 by one (+1).

(A Hybrid Electronic Shutter System)

Figure 24:
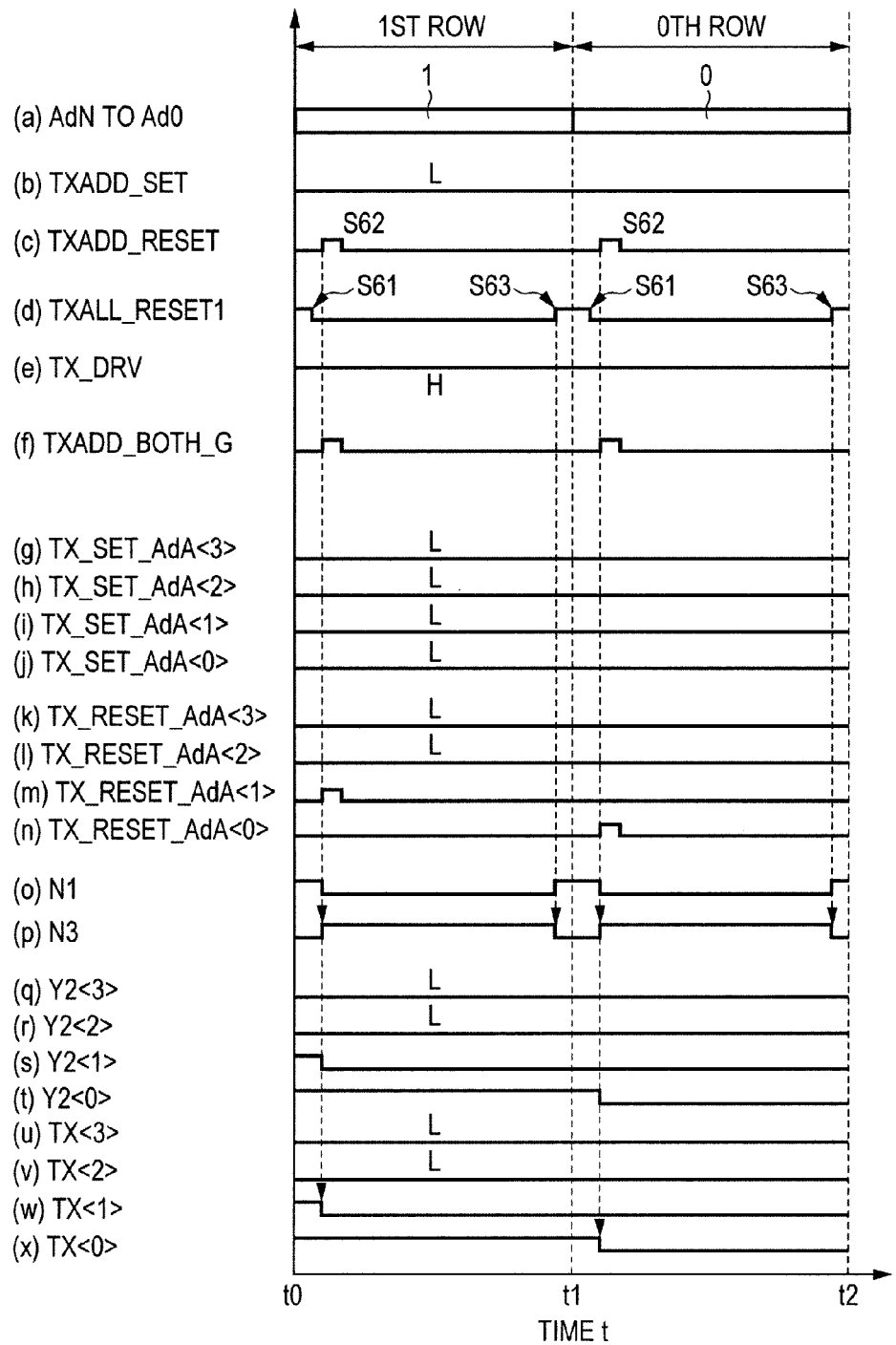
FIG. 24 is a timing chart illustrating a transfer signal at the end of picture element reset of the hybrid electronic shutter.

FIG. 24 is a timing chart illustrating the transfer signal TX at the end of picture element reset (at the time of deactivation (negation) of the transfer signal TX) of the hybrid electronic shutter. In Embodiment 3, the individual latch circuit L<n> is provided in each row, therefore, it is possible to reset all the individual latch circuits L<n> one by one, sequentially, from the state in which the individual latch circuits L<n> of all the rows have been set.

In (a)-(x) of FIG. 24, the forming signal TX_DRV is fixed to an "H" level at the end of picture element reset of the hybrid electronic shutter. The set signals TX_SET_AdA<3:0> are fixed to an "L" level, and the set of all the individual latch circuits L<n> is canceled.

In (a)-(x) of FIG. 24, the state is shown in which the transfer signals TX<1> and TX<0> are at an "H" level at time to. At time t0-t1, the row selection address signal AdN-Ad0 indicating the first row is supplied, and at time t1-t2, the row selection address signal AdN-Ad0 indicating the zeroth row is supplied.

For example, at step S61 at time t0-t1, the reset signal TXALL_RESET1 is set to an "L" level, and the transistor Q8 of all the row selection decoder circuits 71 is set to be non-conductive. Accordingly, reset of the shared latch circuit is canceled.

At Step S62, the address-based latch reset signal TXADD_RSET is enabled, and an individual latch circuit L<1> of the row selected by the address signal AdN-Ad2 except lower-order 2 bits is reset. When the individual latch circuit L<1> is reset, one input node of the logical product circuit AND5<1> of the forming circuit 37 becomes an "L" level, and the transfer signal TX<1> is brought down to an "L" level from an "H" level.

At Step S63, the reset signal TXALL_RESET1 is set to an "H" level, and the transistor Q8 of all the row selection decoder circuits 71 is set to be conductive. Accordingly, the shared latch circuit is reset, in preparation for operation of the next row. Three Steps S61-S63 described above are repeated for every row by decrementing the row selection address signal AdN-Ad0 by one (−1).

Figure 25:
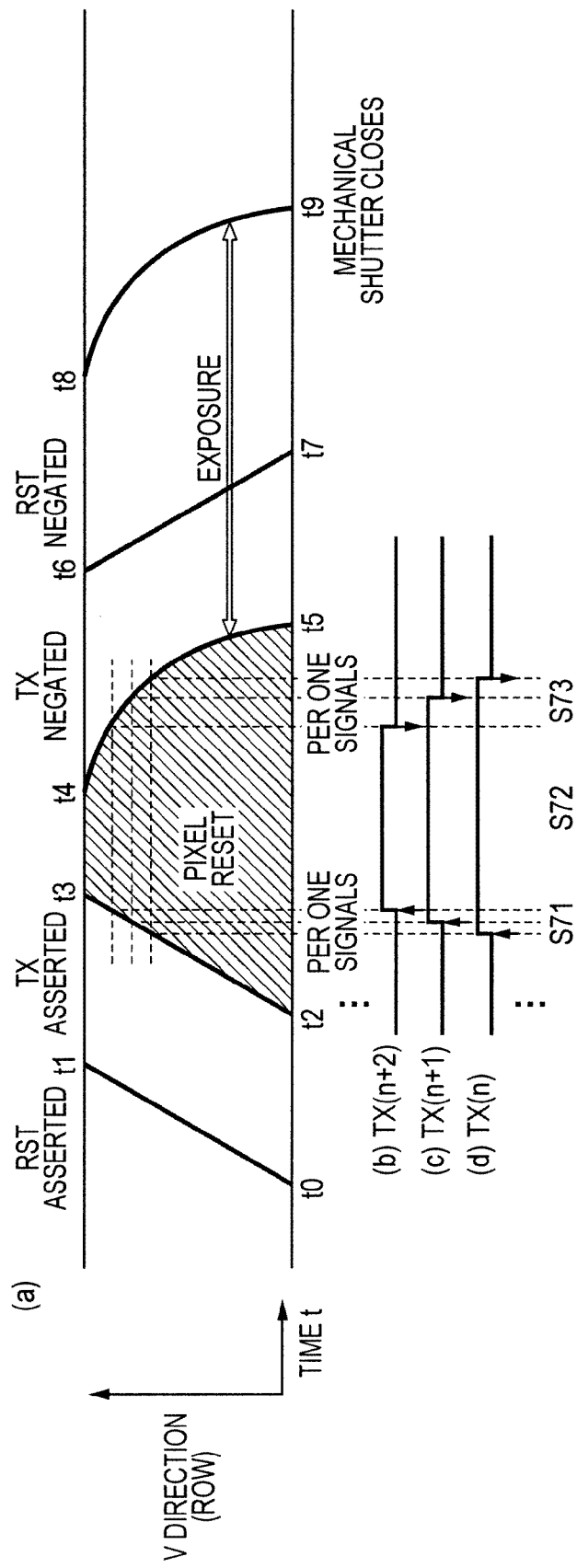
FIG. 25 is a timing chart illustrating hybrid electronic shutter operation in the image sensor illustrated in FIGS. 20-24.

FIG. 25 is a timing chart illustrating the hybrid electronic shutter system employed in the image sensor of Embodiment 3, in comparison with FIG. 19. In (a)-(d) of FIG. 25, at time t0-t1, the row selection address signal AdN-Ad0 is incremented sequentially, and the latch circuit of all the RST decoder 32 is set sequentially. Accordingly, the reset signal RST of all the rows is activated to an "H" level (assertion). Activation (assertion) and deactivation (negation) of the transfer signal TX are performed in three Steps S71-S73.

At Step S71, the row selection address signal AdN-Ad0 is incremented by one (+1) sequentially, and all the individual latch circuits L<n> are set sequentially (time t2-t3). Accordingly, the transfer signal TX of all the rows is activated to an "H" level. At Step S72, all the individual latch circuits L<n> are maintained in a set state.

At Step S73, the row selection address signal AdN-Ad0 is decremented by one (−1) sequentially in a predetermined cycle, and the address-based latch reset signal TXADD_RESET is set to an "H" level for a prescribed time in a predetermined cycle (time t4-t5). Accordingly, the transfer signal TX for every one row is set to an "L" level, and the electronic shutter is driven to the same timing as the mechanical shutter.

In time t6-t7, the row selection address signal AdN-Ad0 is decremented sequentially, and the individual latch circuit of all the RST decoders is reset sequentially. Accordingly, the reset signal RST of all the rows is deactivated to an "L" level. In time t8-t9, the mechanical shutter is closed and taking the photograph (exposure) of a still image by means of the hybrid electronic shutter is completed.

In Embodiment 3, operation is possible in units of rows. Consequently, the timing of the shutter operation of each row can be precisely adjusted to the close operation of the mechanical shutter; accordingly, it is possible to enhance the improvement of the image quality.

(Variable Address Degeneration Function)

Embodiment 3 is characterized by providing a variable address degeneration function to the predecoder 61 of the control circuit 60. As illustrated in FIG. 20, the address AdN-Ad2 except lower-order 2 bits and degenerate number control signals UNI_REG<k:0> are inputted into the predecoder 61 with a variable address degeneration function, and degenerated predecode signals AdB<3:0>, AdC<3:0>, - - - are outputted.

FIG. 26 (a) and FIG. 26 (b) illustrate tables for explaining the operation of the predecoder 61. As illustrated in FIG. 26 (a), when the address signals Ad3=0 and Ad2=0, only the predecode signal AdB<0> of the predecode signals AdB<3:0> is set to 1. When the address signals Ad3=0 and Ad2=1, only the predecode signal AdB<1> of the predecode signals AdB<3:0> is set to 1. When the address signals Ad3=1 and Ad2=0, only the predecode signal AdB<2> of the predecode signals AdB<3:0> is set to 1. When the address signals Ad3=1 and Ad2=1, only the predecode signal AdB<3> of the predecode signals AdB<3:0> is set to 1.

As illustrated in FIG. 26 (b), when the degenerate number control signals UNI_REG<4:0> are 0, 0, 0, and 0, respectively, a higher-order degenerate number is 1 and there is no degenerate address. In this case, all the rows are selected sequentially on a row-by-row basis.

When the degenerate number control signals UNI_REG<4:0> are 0, 0, 0, and 1, respectively, the higher-order degenerate number is 2 and the degenerate address is the top address signal Ad11. In this case, the predecode signals XF<3> and XF<1> coincide with the address signal Ad10, and the predecode signals XF<2> and XF<0> coincide with the inverted signal of the address signal Ad10. In this case, all the rows are divided into two blocks, and the rows are sequentially selected row by row in each block. Therefore, two rows are selected at the same time.

When the degenerate number control signals UNI_REG<4:0> are 0, 0, 1, and 0, respectively, the higher-order degenerate number is 4 and the degenerate addresses are the top address signals Ad11 and Ad10. In this case, the predecode signals XF<3:0> are fixed to 1, 1, 1, and 1, respectively. In this case, all the rows are divided into four blocks, and the rows are selected sequentially, row by row, in each block. Therefore, four rows are selected at the same time. In the same manner, the number of the rows selected at the same time can be increased by changing the degenerate number control signals UNI_REG<4:0>.

FIG. 27 is a timing chart illustrating the hybrid electronic shutter system which employs the variable address degeneration function, in comparison with FIG. 25. In (a)-(g) of FIG. 27, at time t0-t3 and time t6-t7, the degenerate number control signals UNI_REG<4:0> are set to 0, 0, 0, and 1, respectively, and the higher-order degenerate number is set to 2; accordingly, all the rows are divided into two blocks. At time t4-t5, the degenerate number control signals UNI_REG<4:0> are set to 0, 0, 0, and 0, respectively, and the higher-order degenerate number is set to 1; accordingly, the block division is not performed.

At time t0-t1, the row selection address signal AdN-Ad0 is incremented sequentially, and the individual latch circuits of the RST decoder in each of two blocks are set sequentially one by one. Accordingly, the reset signal RST of all the rows is activated to an "H" level (assertion) in a half time compared with the case of (a)-(d) of FIG. 25. Activation (assertion) and deactivation (negation) of the transfer signal TX are performed in three Steps S81-S83.

At Step S81, the row selection address signal AdN-Ad0 is incremented by one (+1) sequentially, and all the individual latch circuits L<n> in each of two blocks are set sequentially (time t2-t3). Accordingly, the transfer signal TX of all the rows is activated to an "H" level in a half time compared with the case of (a)-(d) of FIG. 25. At Step S82, all the individual latch circuits L<n> are maintained in a set state.

At Step S83, the row selection address signal AdN-Ad0 is decremented by one (−1) sequentially in a predetermined cycle, and the address-based latch reset signal TXADD_RESET is set to an "H" level for a prescribed time in a predetermined cycle (time t4-t5). Accordingly, the transfer signal TX for every one row is set to an "L" level, and the electronic shutter is driven to the same timing as the mechanical shutter.

At time t6-t7, the row selection address signal AdN-Ad0 is decremented sequentially, and the individual latch circuits of all the RST decoders in each of two blocks are sequentially reset. Accordingly, the reset signal RST of all the rows is deactivated to an "L" level in a half time compared with the case of (a)-(d) of FIG. 25. At time t8-t9, the mechanical shutter is closed and taking the photograph (exposure) of a still image by means of the hybrid electronic shutter is completed.

In Embodiment 3, the operating time necessary for asserting the signal TX can be reduced to one half as compared with the case where the address degeneration is not performed.

In Embodiment 3, the operating time necessary for asserting the signal TX can be set as shortest time, within the range in which the deficiency due to increase of the amount of IR drop of the power supply voltage does not develop, by adjusting the number of address degeneration.

(A Rolling Electronic Shutter System)

Figure 28:
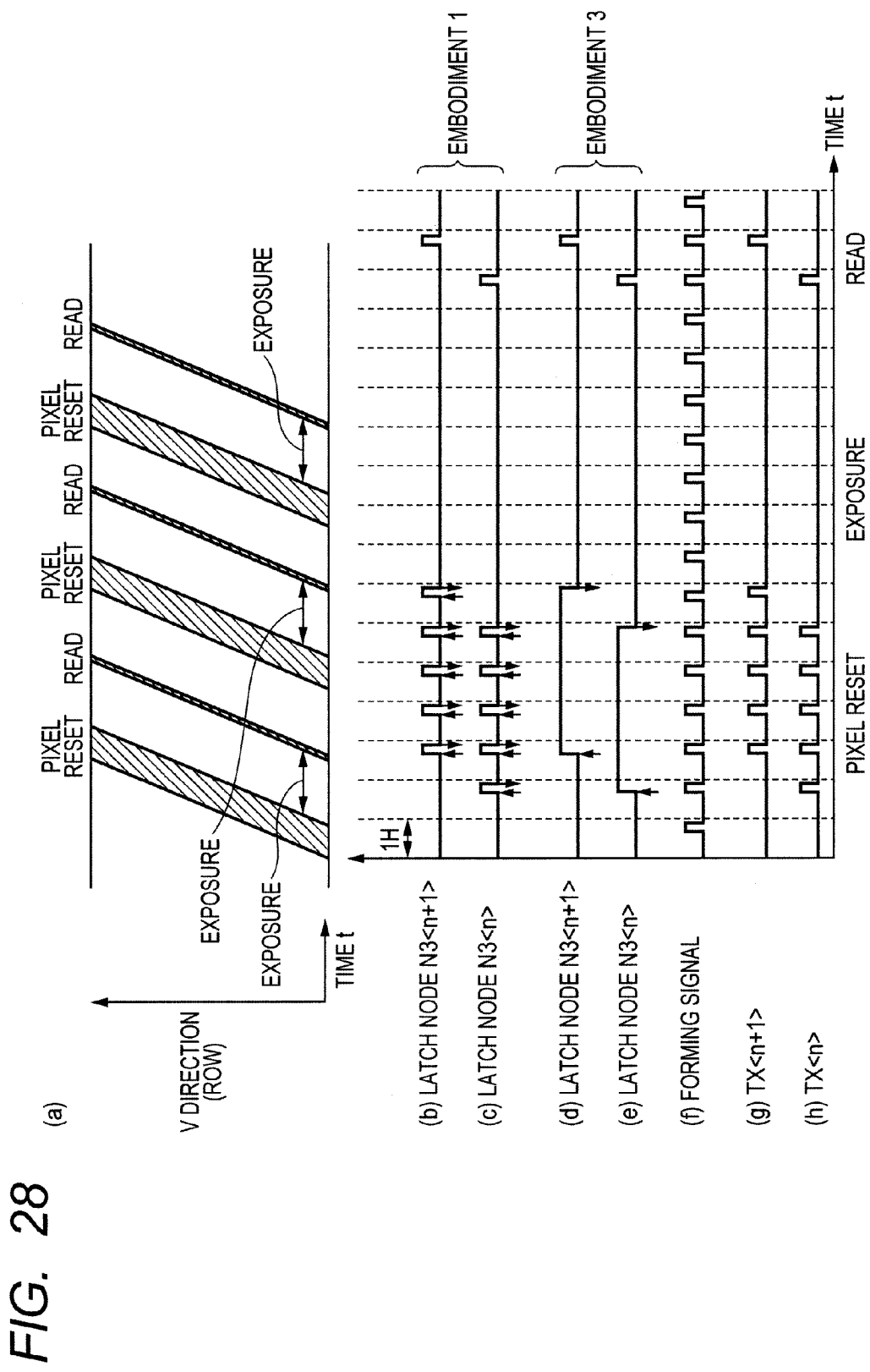
FIG. 28 is a timing chart for explaining the effect of the image sensor illustrated in FIGS. 20-24.

FIG. 28 is a timing chart illustrating schematically the rolling electronic shutter in Embodiments 1 and 3. According to Embodiment 1, as illustrated in (b) and (c) of FIG. 28, it is necessary to access every row, when resetting the pixel circuit 10 of plural rows of the same row group. Since it is necessary to repeat, on a signal-by-signal basis for every horizontal period, "address-based latch set" (an upward arrow in (b) and (c) of FIG. 28) and "reset of all latches by an all-latches reset signal" (a downward arrow in (b) and (c) of FIG. 28), the operating time and the operating current become large.

On the other hand, according to Embodiment 3, as illustrated in (d) and (e) of FIG. 28, the set state of the latch circuit can be held, therefore, "address-based latch set" (an upward arrow in (d) and (e) of FIG. 28) and "address-based latch reset" (a downward arrow in (d) and (e) of FIG. 28) are needed only once, respectively. Accordingly, wasteful operating time and wasteful operating current do not occur.

(Overlap Operation of a Signal)

Figure 29:
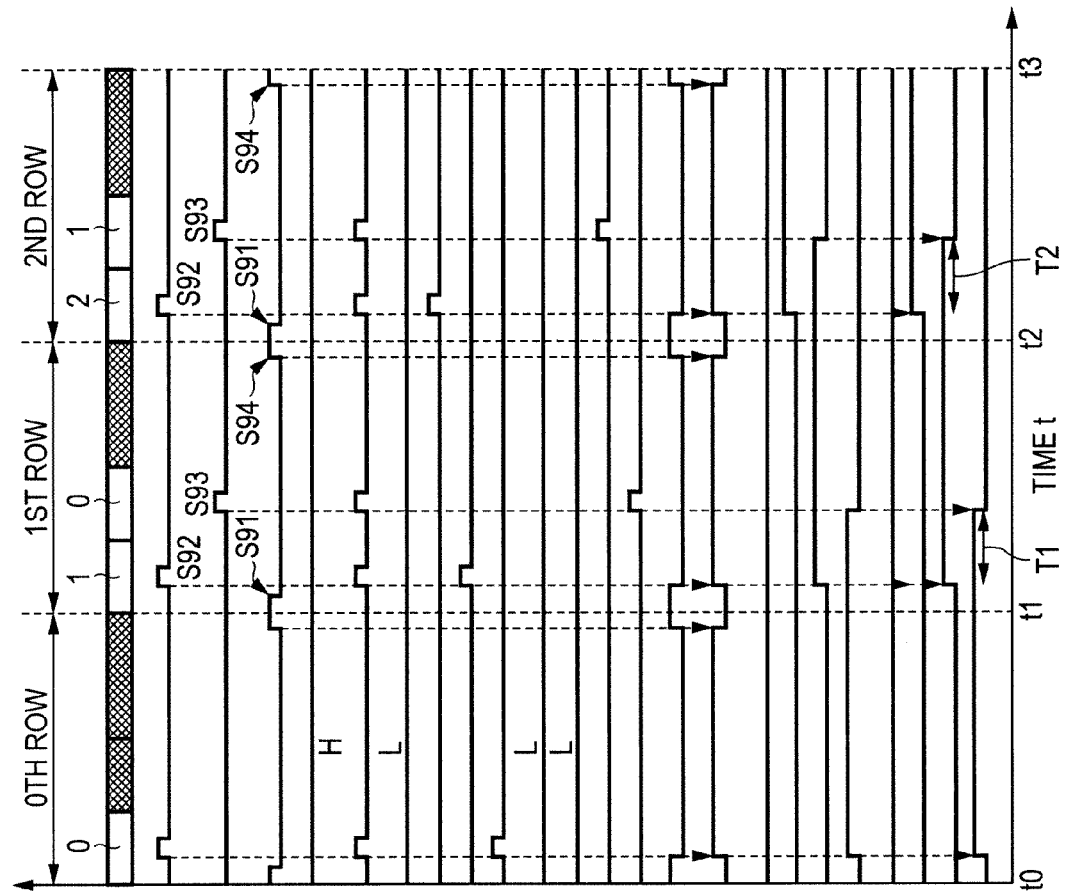
FIG. 29 is a timing chart for explaining a signal overlap function of the image sensor illustrated in FIGS. 20-24.

FIG. 29 is a timing chart illustrating the overlap operation of the transfer signal TX. In (a)-(x) of FIG. 29, the forming signal TX_DRV is fixed to an "H" level in overlap operation. In (a)-(k) of FIG. 29, a state is illustrated in which the transfer signal TX<0> is at an "H" level at time t1.

For example, at Step S91 at time t1-t2, the reset signal TXALL_RESET1 is set to an "L" level, and the transistor Q8 of all the row selection decoder circuits 71 is set to be non-conductive. Accordingly, reset of the shared latch circuit is canceled.

At Step S92, the row selection address signal AdN-Ad0 indicating the first row is supplied and the address-based latch set signal TXADD_SET is enabled. Accordingly, the shared latch circuit of the row group selected by the address signal AdN-Ad2 except the lower-order 2 bits is set, and the node N3 is set to an "H" level. The individual latch circuit L<1> of the row selected by the lower-order 2-bit address signal Ad1-Ad0 is set. When the individual latch circuit L<1> is reset, one input node of the logical product circuit AND5<1> of the forming circuit 37 is set to an "H" level, and the transfer signal TX<1> is brought up from an "L" level to an "H" level.

At Step S93, the row selection address signal AdN-Ad0 indicating the zeroth row is supplied, and the address-based latch reset signal TXADD_RESET is enabled. Accordingly, the individual latch circuit L<0> of the row selected by the lower-order 2-bit address signal Ad1-Ad0 is reset. When the individual latch circuit L<0> is set, one input node of the logical product circuit AND5<0> of the forming circuit 37 is set to an "L" level, and the transfer signal TX<0> is brought down from an "H" level to an "L" level. Therefore, in the overlap period T1 of (x) of FIG. 29, the transfer signals TX<0> and TX<1> are set to an "H" level.

At Step S94, the reset signal TXALL_RESET1 is set to an "H" level, and the transistor Q8 of all the row selection decoder circuits 71 is set to be conductive. Accordingly, the shared latch circuit is reset, in preparation for operation of the next row. Four Steps S91-S94 described above are repeated for every row by incrementing the row selection address signal AdN-Ad0 by one (+1).

One of the specific examples is the overlap operation of the selection signal SEL. As illustrated in FIG. 3, when the selection signal SEL is set to an "H" level as an activation level, a current of a level corresponding to a voltage of the node N12 flows through the vertical signal line LV. When the selection signal SEL of all the rows is set to an "L" level as a deactivation level, no current flows through the vertical signal line LV, but the voltage of the vertical signal line LV falls down to the ground voltage GND, inducing an adverse influence on the next operation. However, in Embodiment 3, overlap of the selection signal SEL is allowed; accordingly, one of the selection signals SEL of all the rows can certainly be set to an activation level. Therefore, it is possible to prevent that the voltage of the vertical signal line LV falls down to the ground voltage GND.

It should be understood by those skilled in the art that the embodiments disclosed in the present application are illustrative and not restrictive, with all the points of view. The scope of the present invention is illustrated not by the explanatory description given above but by the scope of the appended claims, and it is meant that various modifications, combinations, and alterations may occur depending on design requirements and other factors insofar as they are within the scope of the appended claims or the equivalents thereof.

What is claimed is:

1. An image sensor comprising:
a plurality of pixel circuits arranged in a plurality of rows and a plurality of columns, each controlled by a plurality of control signals and operable to convert incident light into an electrical signal;
a pixel array including a plurality of horizontal signal lines each provided corresponding to each row in order to transfer the plural control signals, and a plurality of vertical signal lines respectively provided corresponding to the plural columns;
a selection circuit operable to select one of the plural rows;
a control signal generating circuit provided corresponding to each control signal and operable to supply, via a horizontal signal line corresponding to a row selected by the selection circuit, a corresponding control signal to each of the plural pixel circuits of the row; and
a read circuit operable to read a plurality of electrical signals outputted to the plural vertical signal lines from the plural pixel circuits of the row selected by the selection circuit,
wherein the control signal generating circuit comprises:
a logic circuit provided corresponding to each row and operable to set a first signal to a selection level when the corresponding row is selected by the selection circuit, and operable to set the first signal to a non-selection level when the corresponding row is not selected by the selection circuit;
a latch circuit provided corresponding to each row and operable to set a second signal to an activation level after being set when the corresponding first signal is set to the selection level, and operable to set the second signal to a deactivation level after being reset by a reset signal;
a forming signal generating circuit operable to generate a forming signal; and
a gate circuit provided corresponding to each row and operable to supply the forming signal to a horizontal signal line of the corresponding row as a corresponding control signal when the corresponding second signal is set to the activation level,
wherein the latch circuit serves as a voltage level shift circuit operable to transform a high side level of a digital signal from a first voltage to a second voltage higher than the first voltage, and
wherein the first signal includes a digital signal having a high side level of the first voltage and a low side voltage level of a third voltage lower than the first voltage, and the second signal
includes a digital signal having a high side level of the second voltage and a lower side level of a fourth voltage lower than the second voltage.

2. An image sensor comprising:
a plurality of pixel circuits arranged in a plurality of rows and a plurality of columns, each controlled by a plurality of control signals and operable to convert incident light into an electrical signal;
a pixel array including a plurality of horizontal signal lines each provided corresponding to each row in order to transfer the plural control signals, and a plurality of vertical signal lines respectively provided corresponding to the plural columns;

a selection circuit operable to select one of the plural rows;

a control signal generating circuit provided corresponding to each control signal and operable to supply, via a horizontal signal line corresponding to a row selected by the selection circuit, a corresponding control signal to each of the plural pixel circuits of the row; and a read circuit operable to read a plurality of electrical signals outputted to the plural vertical signal lines from the plural pixel circuits of the row selected by the selection circuit, wherein the plural rows are divided in advance into a plurality of row groups each having M rows (M is an integer equal to or greater than two), wherein the selection circuit comprises:

a first sub selection circuit operable to select one row group of the plural row groups; and a second sub selection circuit operable to select one row of the M rows belonging to the row group selected by the first sub selection circuit, wherein the control signal generating circuit comprises:

a logic circuit provided corresponding to each row group and operable to set a first signal to a selection level when the corresponding row group is selected by the first sub selection circuit, and operable to set the first signal to a non-selection level when the corresponding row group is not selected by the first sub selection circuit;

a latch circuit provided corresponding to each row group and operable to set a second signal to an activation level after being set when the corresponding first signal is set to the selection level, and operable to set the second signal to a deactivation level after being reset by a reset signal;

M forming signal generating circuits provided in the plural row groups in common, corresponding to M rows respectively, and each operable to generate a forming signal when the corresponding row is selected by the sub selection circuit; and M gate circuits provided corresponding to M rows of each row group respectively, and operable to supply the forming signal generated by the corresponding forming signal generating circuit to the corresponding horizontal signal line as the corresponding control signal, when the corresponding second signal is set to an activation level, wherein the latch circuit serves as a voltage level shift circuit operable to transform a high side level of a digital signal from a first voltage to a second voltage higher than the first voltage, and wherein the first signal includes a digital signal having a high side level of the first voltage and a low side voltage level of a third voltage lower than the first voltage, and the second signal includes a digital signal having a high side level of the second voltage and a lower side level of a fourth voltage lower than the second voltage.

3. An image sensor comprising:

a plurality of pixel circuits arranged in a plurality of rows and a plurality of columns, each controlled by a plurality of control signals and operable to convert incident light into an electrical signal;

a pixel array including a plurality of horizontal signal lines each provided corresponding to each row in order to transfer the plural control signals, and a plurality of vertical signal lines respectively provided corresponding to the plural columns;

a selection circuit operable to select one of the plural rows;

a control signal generating circuit provided corresponding to each control signal and operable to supply, via a horizontal signal line corresponding to a row selected by the selection circuit, a corresponding control signal to each of the plural pixel circuits of the row; and a read circuit operable to read a plurality of electrical signals outputted to the plural vertical signal lines from the plural pixel circuits of the row selected by the selection circuit, wherein the plural rows are divided in advance into a plurality of row groups each having M rows (M is an integer equal to or greater than two), wherein the selection circuit comprises:

a first sub selection circuit operable to select one row group of the plural row groups; and a second sub selection circuit operable to select one row of the M rows belonging to the row group selected by the first sub selection circuit, wherein the control signal generating circuit comprises:

a logic circuit provided corresponding to each row group and operable to set a first signal to a selection level when the corresponding row group is selected by the first sub selection circuit, and operable to set the first signal to a non-selection level when the corresponding row group is not selected by the first sub selection circuit;

a latch circuit provided corresponding to each row group and operable to set a second signal to an activation level after being set when the corresponding first signal is set to the selection level, and operable to set the second signal to a deactivation level after being reset by a reset signal;

a forming signal generating circuit operable to generate a forming signal;

M sub latch circuits provided corresponding to M rows of each row group respectively and being activated when the corresponding second signal is set to an activation level, and each being set by a sub set signal and being reset by a sub reset signal;

a latch control circuit operable to supply the sub set signal or the sub reset signal to a sub latch circuit which is one of the M sub latch circuits and corresponds to the row selected by the second sub selection circuit; and a gate circuit provided corresponding to each row and operable to supply the forming signal to a horizontal signal line as the corresponding control signal when the corresponding sub latch circuit is set, wherein the latch circuit serves as a voltage level shift circuit operable to transform a high side level of a digital signal from a first voltage to a second voltage higher than the first voltage, and wherein the first signal includes a digital signal having a high side level of the first voltage and a low side voltage level of a third voltage lower than the first voltage, and the second signal includes a digital signal having a high side level of the second voltage and a lower side level of a fourth voltage lower than the second voltage.

4. The image sensor according to claim 3, wherein the selection circuit further comprises:

a degenerate circuit operable to divide the plural row groups into a plurality of blocks each having m row groups (m is an integer equal to or greater than two) in a degenerate mode, and wherein the first sub selection circuit selects m row groups sequentially in each of the plural blocks in the degenerate mode.

5. The image sensor according to claim 1,
wherein each of the non-selection level of the first signal and the deactivation level of the second signal is a reference voltage,
wherein the latch circuit comprises:
a first switching element coupled between a first node and a line of the reference voltage and being conducted when the corresponding first signal is set to a selection level;
a first inverter coupled between the first node and a second node; and
a second inverter coupled between the second node and the first node,
wherein each of the first inverter and the second inverter is driven by the second power supply voltage and the reference voltage, and
wherein the second signal is a signal generated at the second node.

6. The image sensor according to claim 5,
wherein the latch circuit further comprises:
a second switching element coupled between a line of the second power supply voltage and the first node, and being conducted in response to the reset signal.

7. The image sensor according to claim 5,
wherein the latch circuit further comprises:
a second switching element coupled between the second node and a line of the reference voltage, being conducted in response to the reset signal when the corresponding first signal is set to a selection level, and being non-conducted when the corresponding first signal is set to a non-selection level.

8. The image sensor according to claim 5,
wherein the latch circuit further comprises:
a second switching element coupled between the second node and a line of the reference voltage, and being conducted in response to the reset signal.

9. The image sensor according to claim 1,
wherein the control signal generating circuit further comprises:
a sub voltage level shift circuit provided between the latch circuit and the gate circuit, and operable to shift the deactivation level of the corresponding second signal to a third power supply voltage lower than the reference voltage, and
wherein each of the sub voltage level shift circuit and the gate circuit is driven by the second power supply voltage and the third power supply voltage.

* * * * *